United States Patent
Rad et al.

(10) Patent No.: US 11,606,948 B2
(45) Date of Patent: Mar. 21, 2023

(54) CHEMICAL APPLICATOR FOR PLANT MATERIAL

(71) Applicant: ARIANA HOLDINGS PTY LTD, Adelaide (AU)

(72) Inventors: Omid Rad, Adelaide (AU); George Campbell, Mile End (AU)

(73) Assignee: ARIANA HOLDINGS PTY LTD, Adelaide (AU)

( * ) Notice: Subject to any disclaimer, the term of this patent is extended or adjusted under 35 U.S.C. 154(b) by 371 days.

(21) Appl. No.: 16/478,901

(22) PCT Filed: Jan. 25, 2018

(86) PCT No.: PCT/AU2018/050050
§ 371 (c)(1),
(2) Date: Jul. 18, 2019

(87) PCT Pub. No.: WO2018/137000
PCT Pub. Date: Aug. 2, 2018

(65) Prior Publication Data
US 2019/0380326 A1 Dec. 19, 2019

(30) Foreign Application Priority Data

Jan. 27, 2017 (AU) ............................ 2017900242
May 8, 2017 (AU) ............................. 2017901692

(51) Int. Cl.
*A01G 7/06* (2006.01)
*A01M 21/04* (2006.01)

(52) U.S. Cl.
CPC ............. *A01M 21/043* (2013.01); *A01G 7/06* (2013.01)

(58) Field of Classification Search
CPC ............................... A01M 21/043; A01G 7/06
(Continued)

(56) References Cited

U.S. PATENT DOCUMENTS 1,781,004 A * 11/1930 Giezentanner ....... A01G 25/145
   111/7.3
2,116,591 A * 5/1938 Barber ..................... A01G 7/06
   101/50
(Continued)

FOREIGN PATENT DOCUMENTS

EP 1959731 A1 8/2008
GB 2048748 A * 12/1980 ............. A01G 23/12
(Continued)

OTHER PUBLICATIONS

Verhoeven, M. et al., "Applying ceramic nanoporous microneedle arrays as a transport interface in egg plants and an ex-vivo human skin model", Microelectronic Engineering, vol. 98 (2012), pp. 659-662. Abstract, figures 5, 5a; p. 660, section 2.2, section 2.4; p. 661, section 3, first and fourth paragraphs.
(Continued)

*Primary Examiner* — Ebony E Evans
(74) *Attorney, Agent, or Firm* — Sand, Sebolt & Wernow Co., LPA

(57) ABSTRACT

There is proposed an apparatus for introducing a chemical into a plant tissue of a target plant, including a body being graspable by a user, and an applicator portion attachable to or forming a part of the body, the applicator portion including a reservoir chamber for holding the chemical, and one or more elongate porous piercing elements, in fluid communication with the reservoir chamber, being configured to pierce the plant tissue, wherein the chemical within the reservoir chamber is drawn or moves into the one or more elongate porous piercing elements, such that as the one or more elongate porous piercing elements penetrate into or through the plant tissue the chemical is applied to an edge of a resultant incision therein.

18 Claims, 23 Drawing Sheets

(58) Field of Classification Search
USPC .......................................................... 47/1.5
See application file for complete search history.

(56) References Cited

U.S. PATENT DOCUMENTS

| | | | | |
|---|---|---|---|---|
| 2,261,368 A * | 11/1941 | Hecht | ..................... | A01G 7/06 435/254.1 |
| 2,309,391 A * | 1/1943 | Hecht | ..................... | A01G 7/06 47/57.5 |
| 3,576,276 A * | 4/1971 | Clarke | ..................... | A01G 7/06 222/386 |
| 4,011,685 A * | 3/1977 | Boyd | ..................... | A01G 7/06 422/550 |
| 4,126,962 A * | 11/1978 | Polcaro | .................. | A47L 25/00 15/210.1 |
| 4,357,779 A | 11/1982 | Maddock | | |
| 4,833,824 A * | 5/1989 | Cronenwett | ............. | A01G 7/06 47/57.5 |
| 4,947,580 A * | 8/1990 | Moore | ................ | A01M 21/043 47/1.5 |
| 5,239,773 A * | 8/1993 | Doolittle, Jr. | .......... | A01G 29/00 47/57.5 |
| 5,724,765 A * | 3/1998 | Wegner | ............... | A01M 21/043 47/1.5 |
| 6,334,856 B1 | 1/2002 | Allen et al. | | |
| 6,532,668 B1 * | 3/2003 | Bloom | ..................... | A01G 3/00 30/123 |
| 6,611,707 B1 * | 8/2003 | Prausnitz | ........... | A61B 5/14514 604/21 |
| 7,555,864 B2 * | 7/2009 | Burgess | .................. | A01G 7/06 47/57.5 |
| 11,207,708 B2 * | 12/2021 | Dubiel | ................. | B05C 17/015 |
| 2008/0312635 A1 | 12/2008 | Rad | | |
| 2010/0312191 A1 | 12/2010 | Allen et al. | | |
| 2018/0125055 A1* | 5/2018 | Petersen | ............ | A01M 7/0046 |

FOREIGN PATENT DOCUMENTS

| | | | | |
|---|---|---|---|---|
| WO | WO-2007068045 A1 * | 6/2007 | .............. | A61D 7/00 |
| WO | WO-2016070005 A1 * | 5/2016 | ........... | F16K 31/001 |

OTHER PUBLICATIONS

Sanjay, S. et al., "Controlled Drug Delivery Using Microdevices", Current Pharmaceutical Biotechnology, 2016, vol. 17, No. 5, pp. 1-16. page 2, section 1.2, first paragraph; p. 3, first paragraph; p. 3, section 3, first paragraph; p. 11, section 4.3, first paragraph; p. 11, section 4.4, first and second paragraphs; p. 12, section 4-5, first and second paragraphs.

* cited by examiner

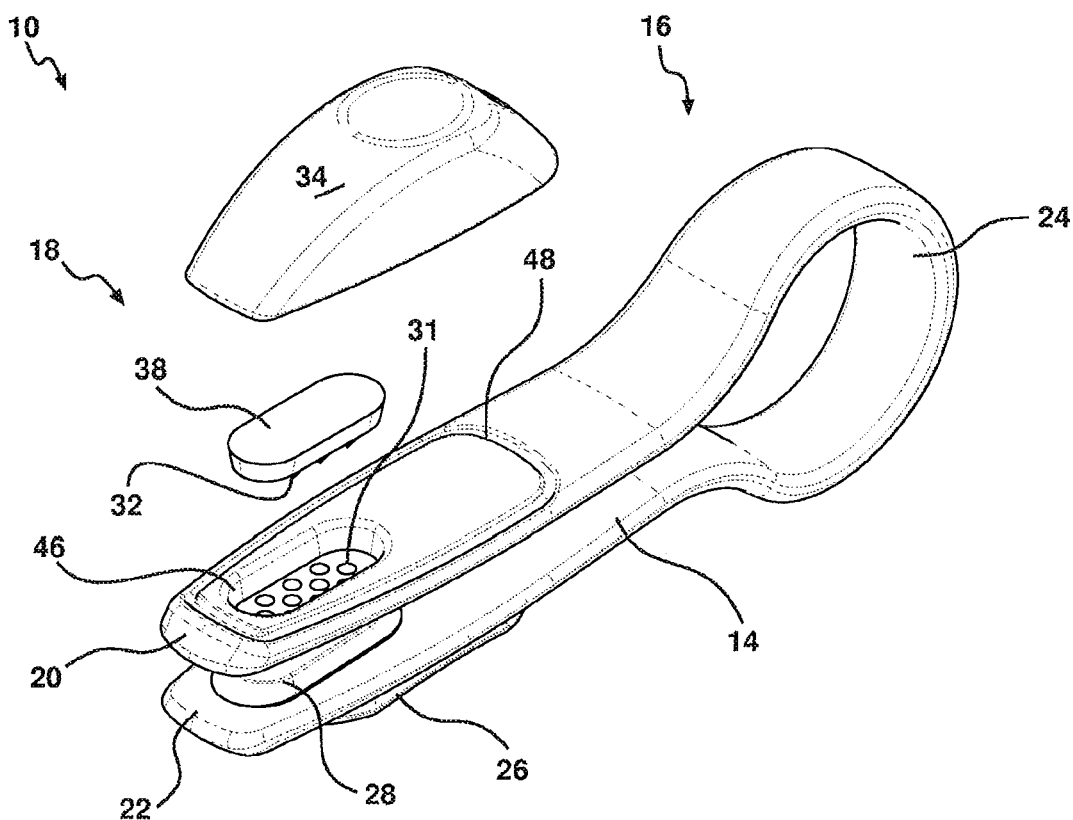
*Figure 7*
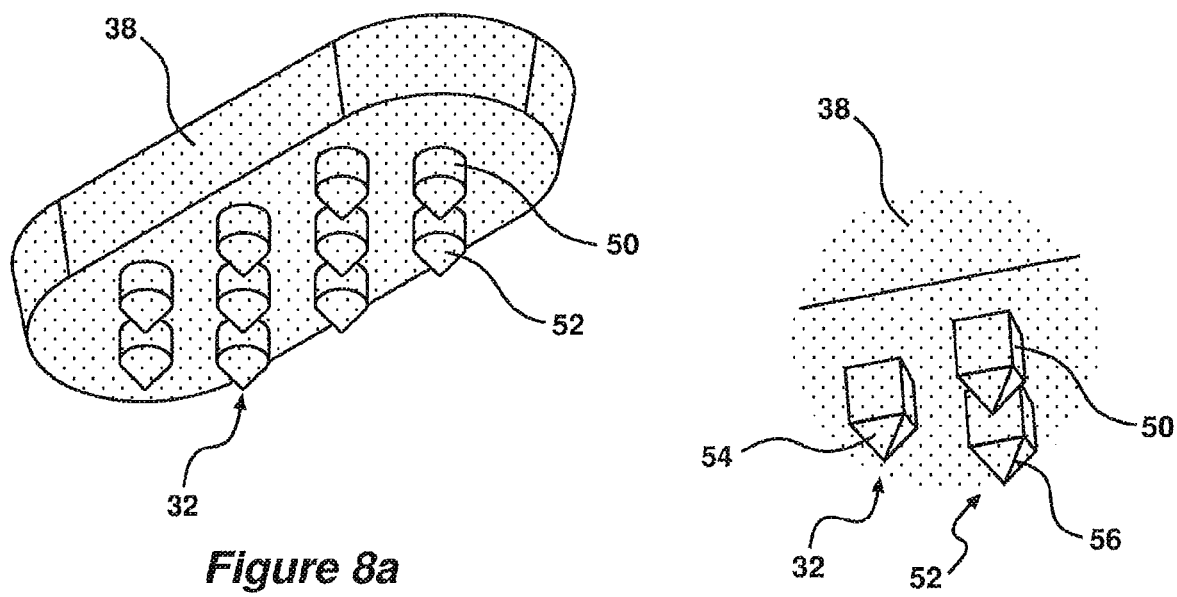
*Figure 8a*
*Figure 8b*

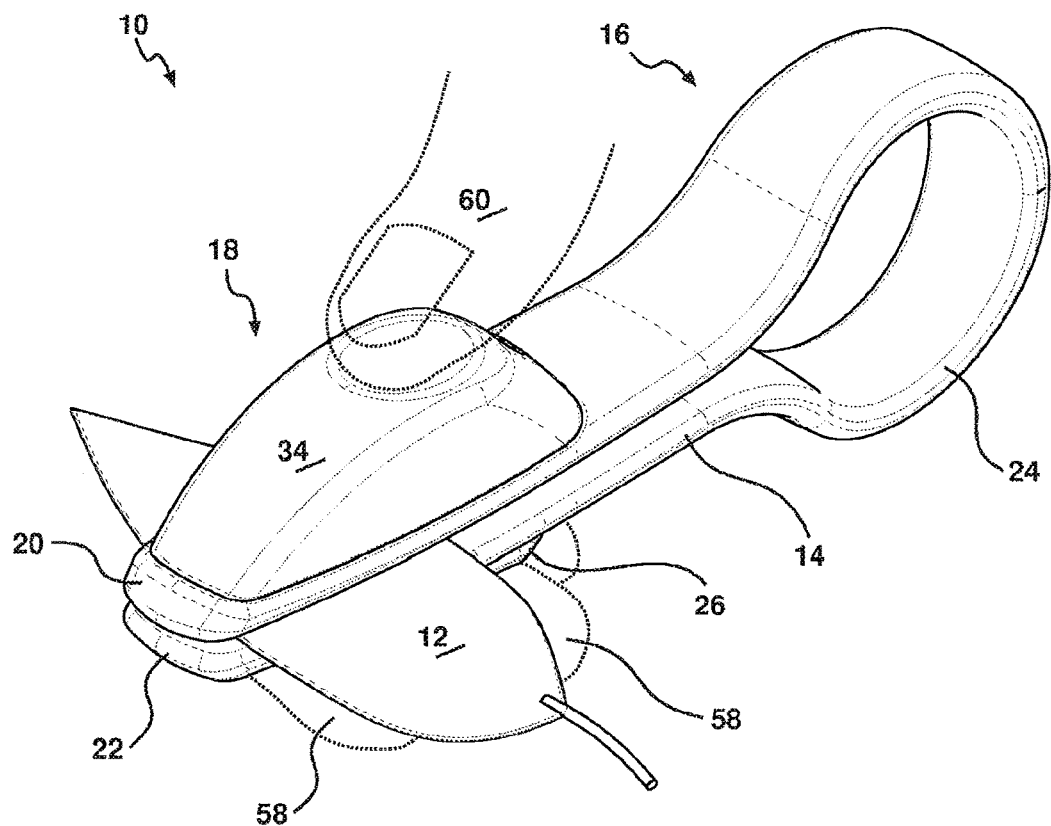
*Figure 9*
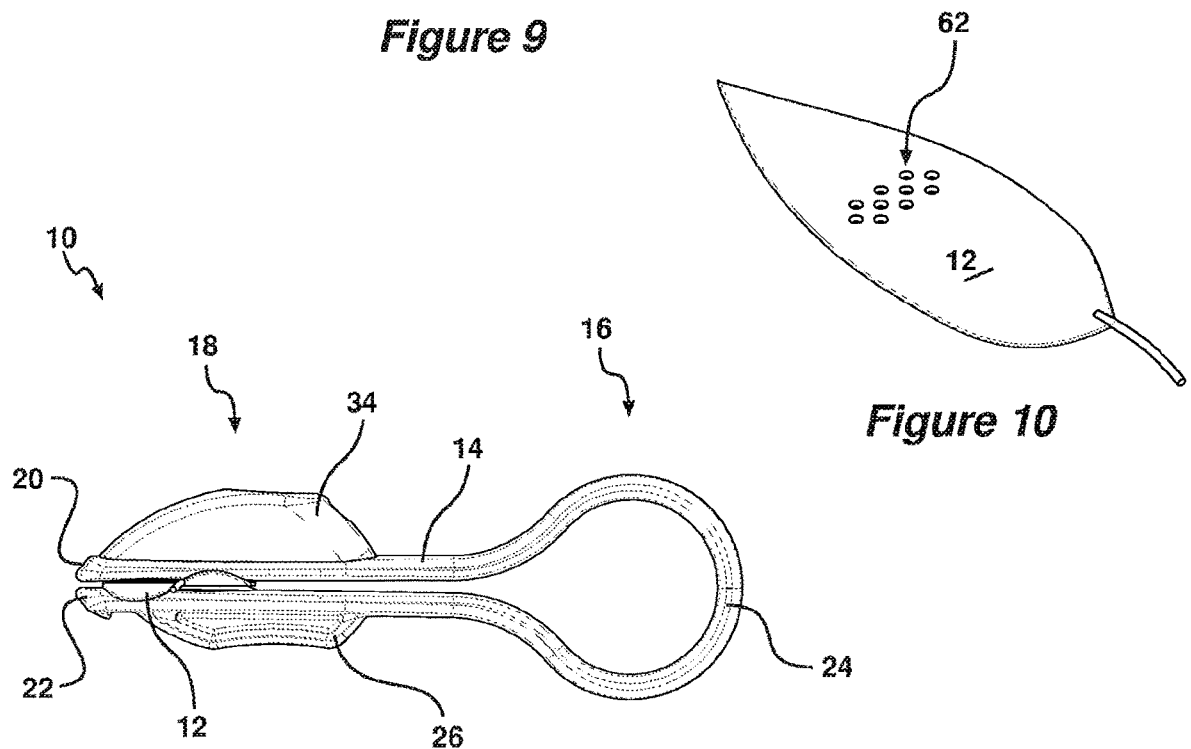
*Figure 10*
*Figure 11*

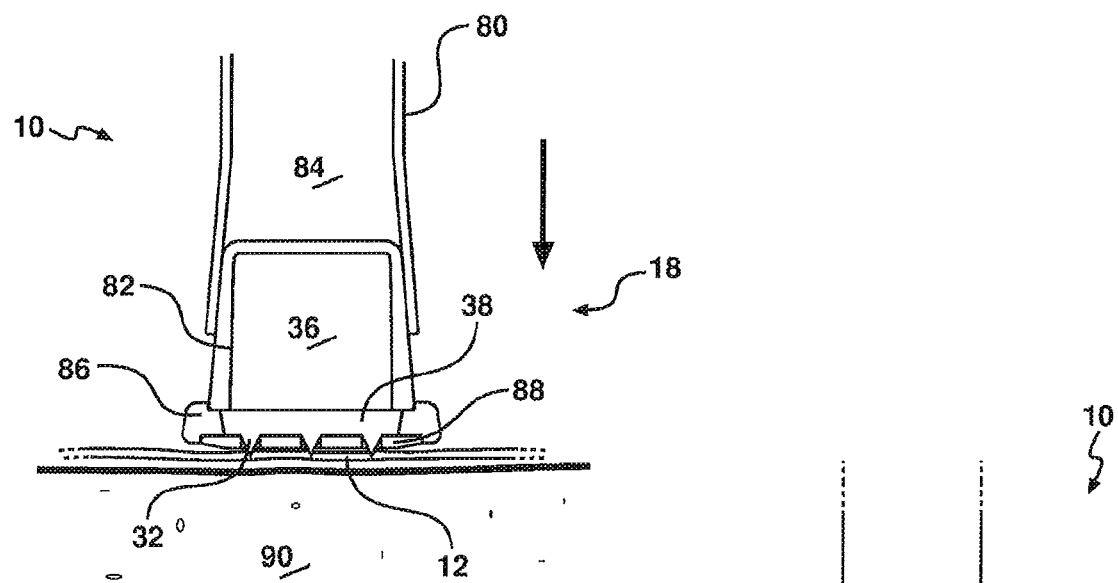
Figure 24
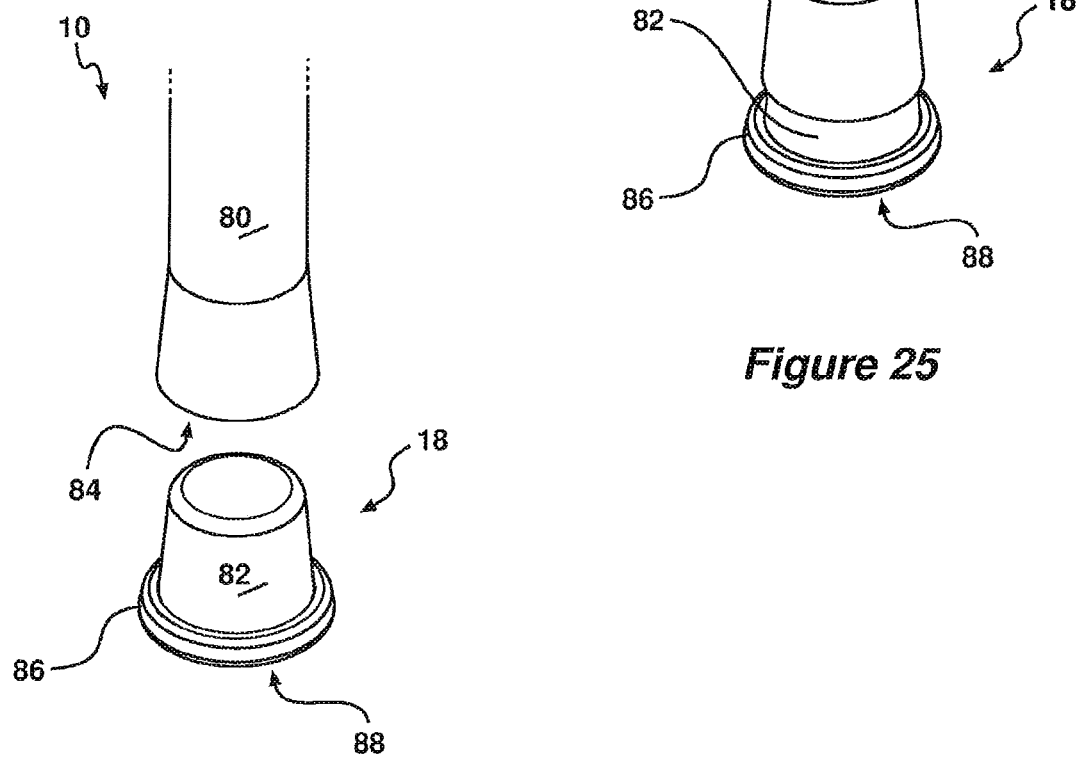
Figure 25
Figure 26

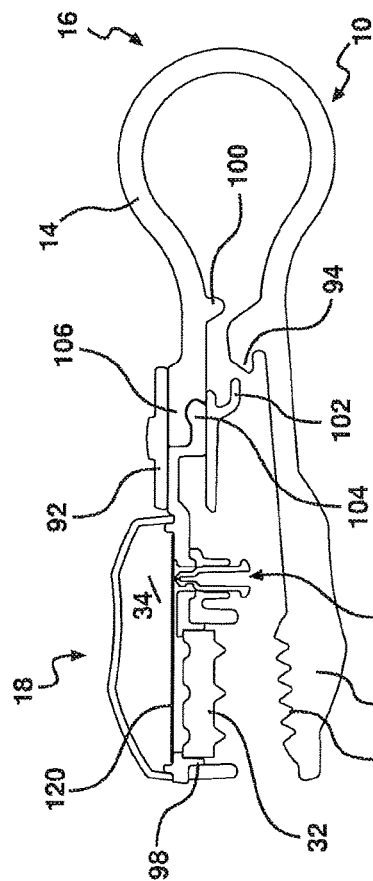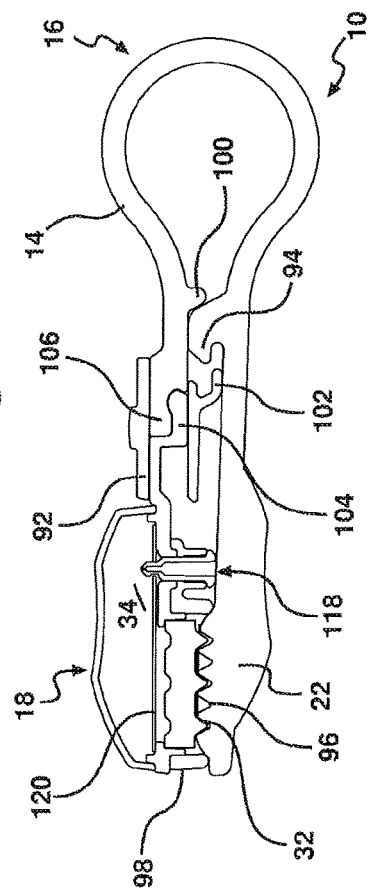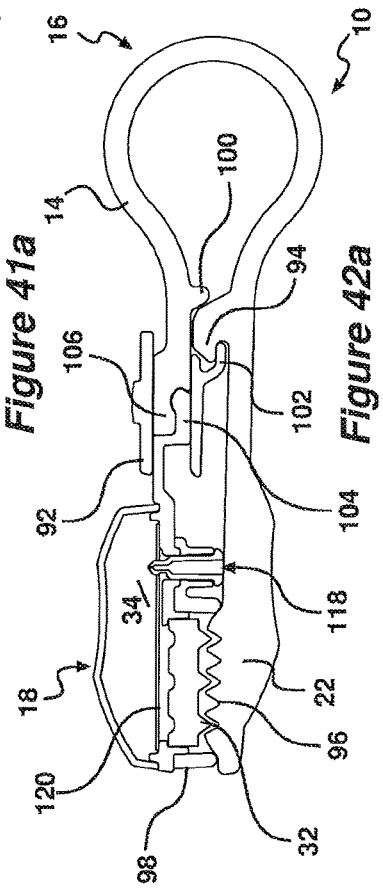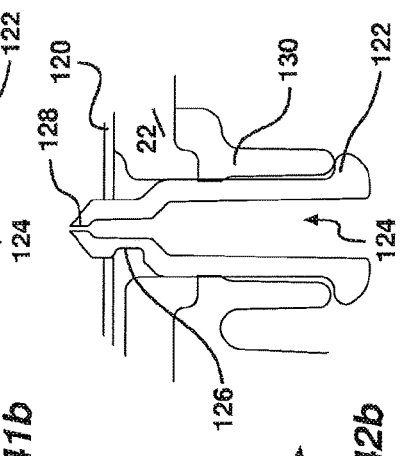

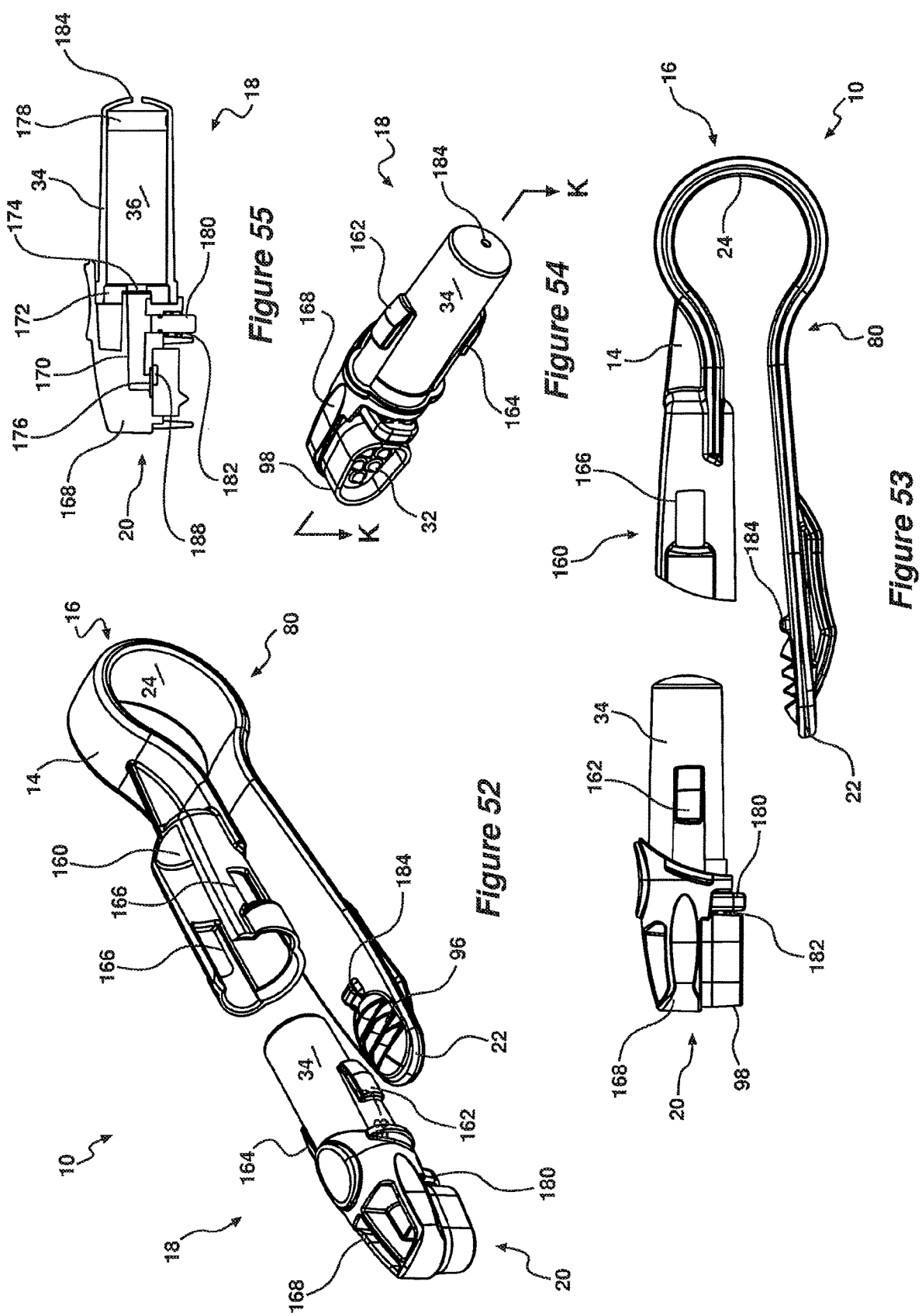

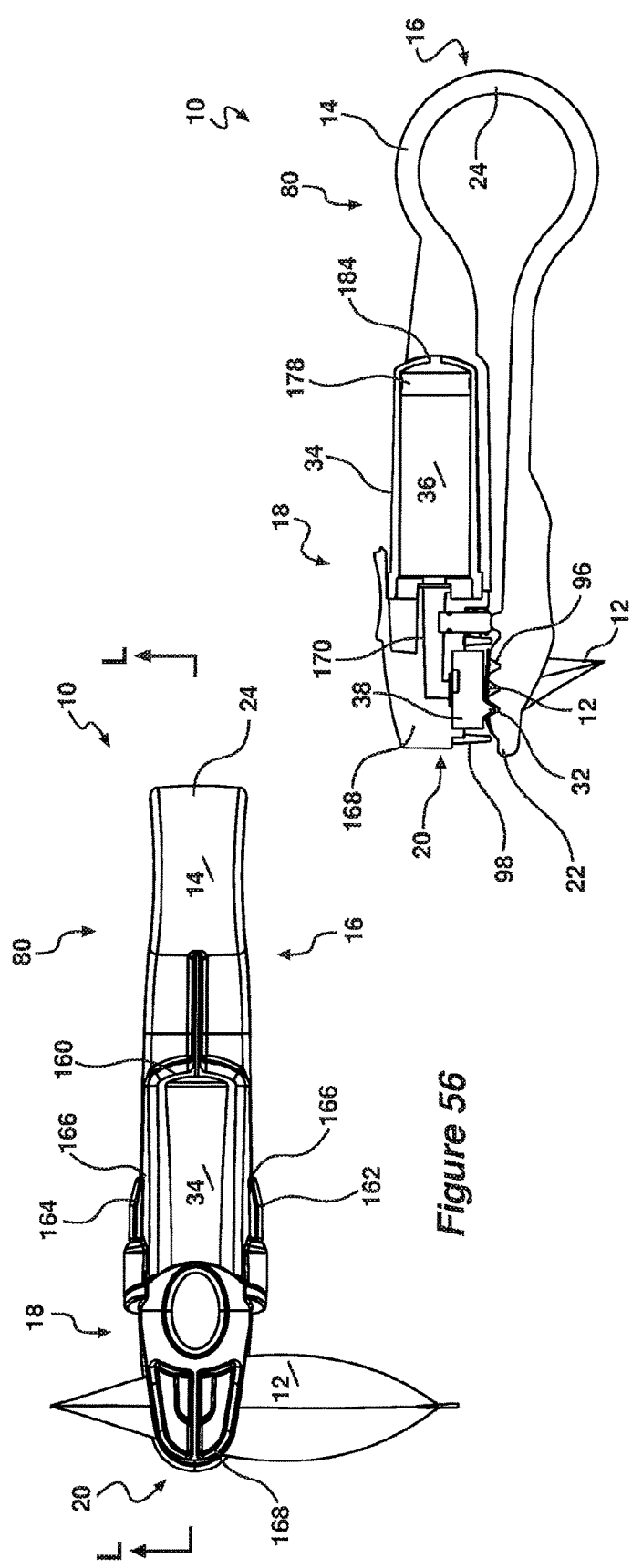
*Figure 57*
*Figure 56*
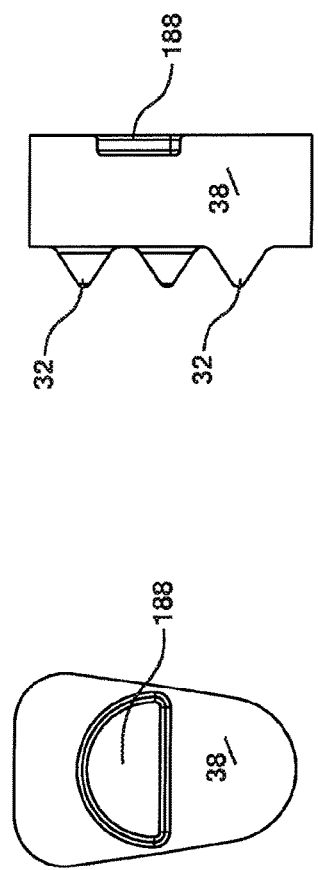
*Figure 60*
*Figure 59*
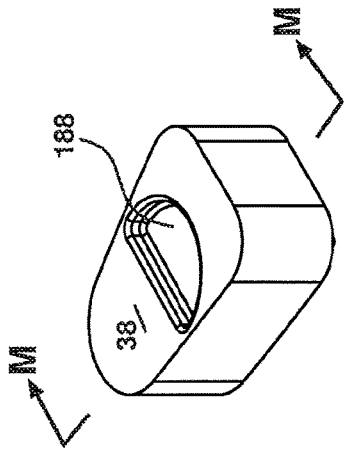
*Figure 58*

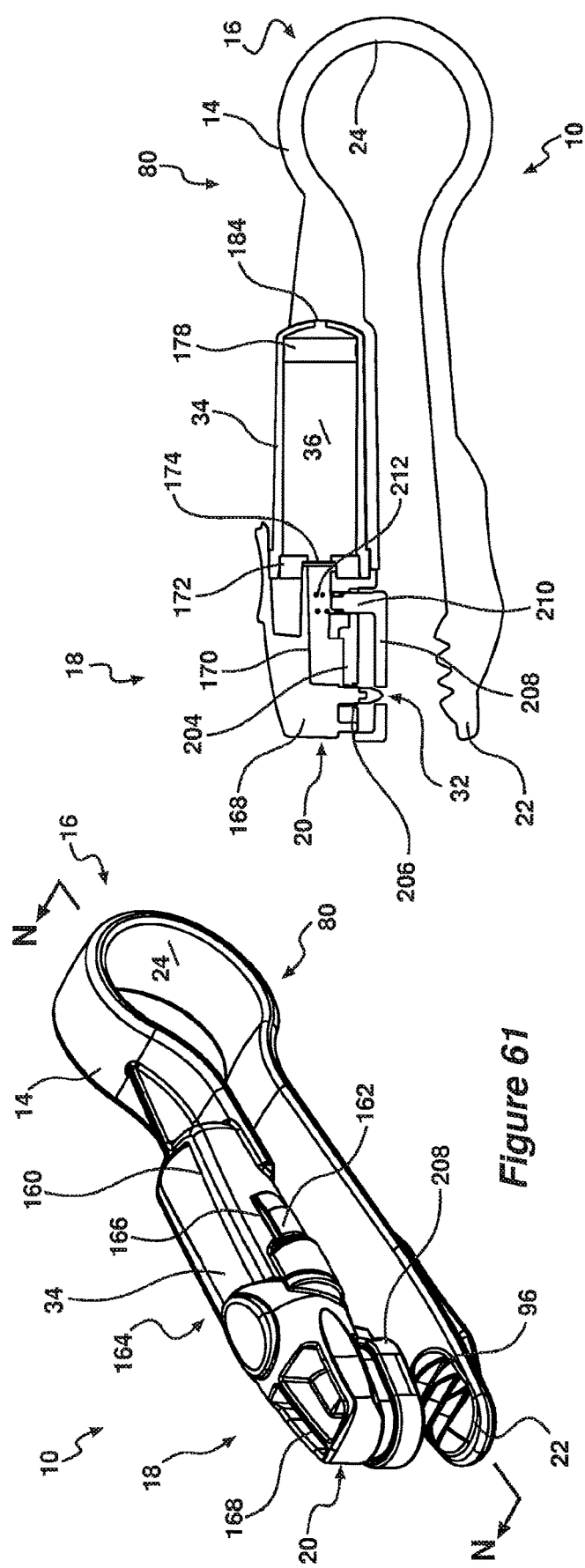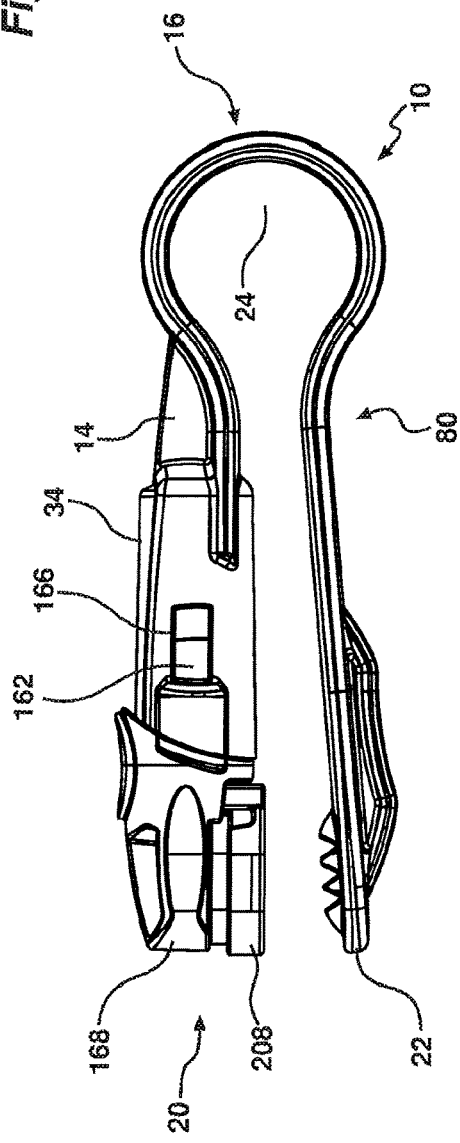

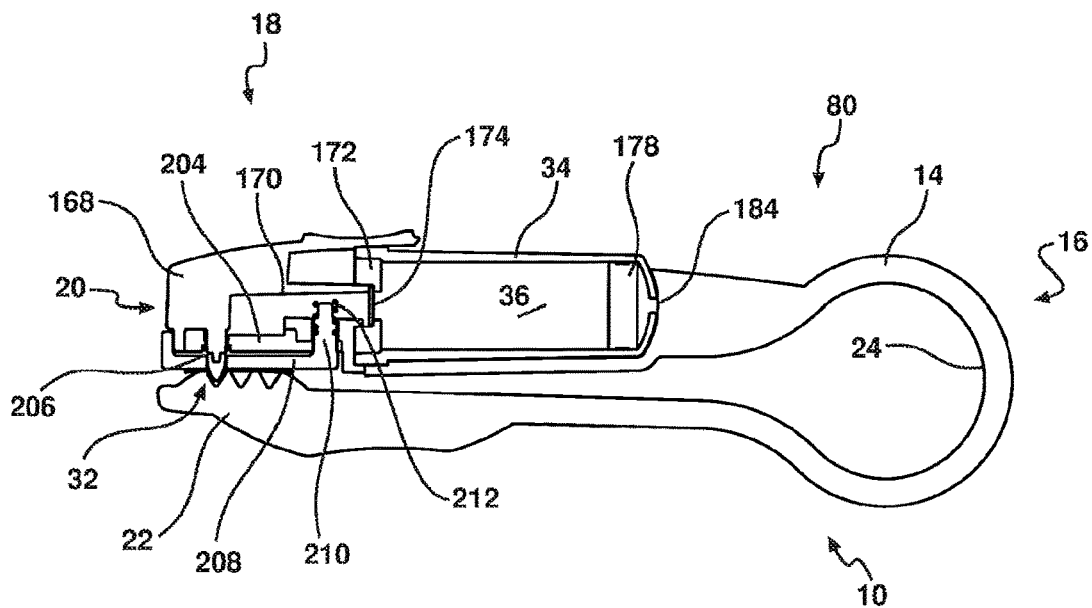
Figure 64
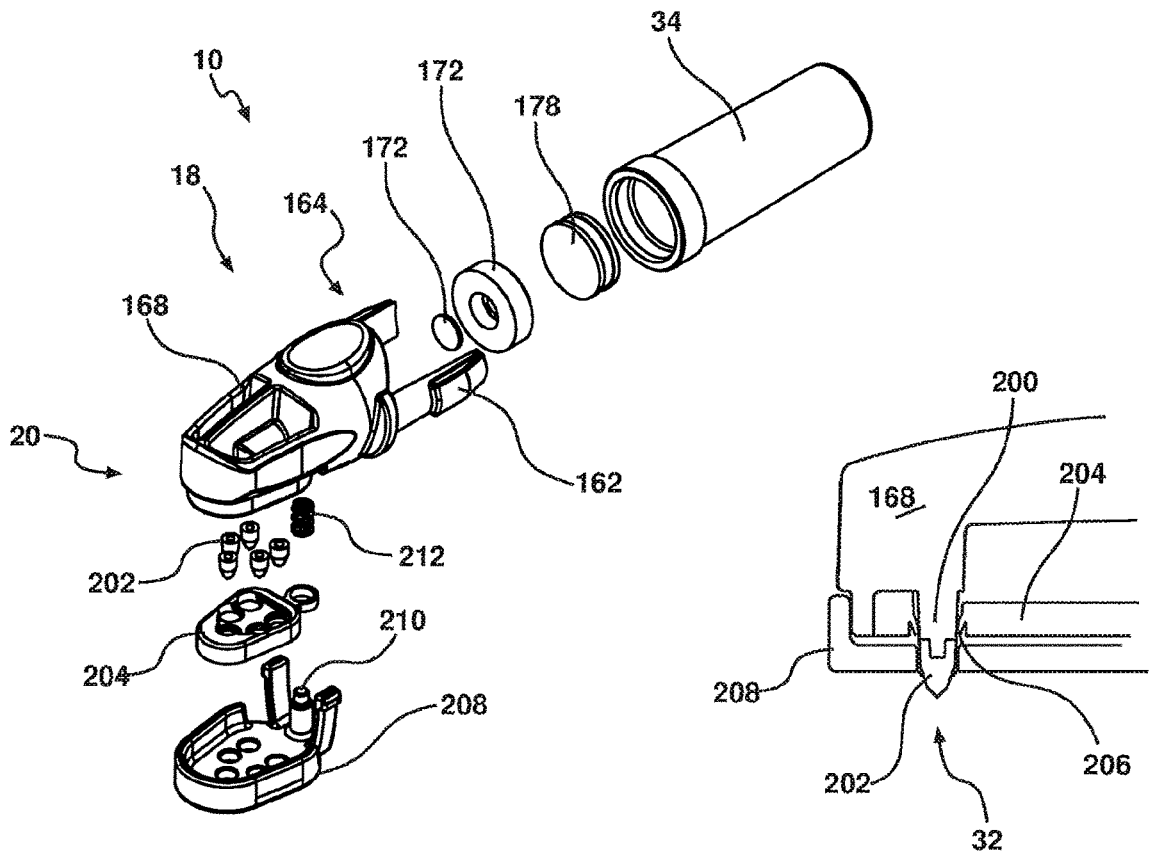
Figure 65
Figure 66

CHEMICAL APPLICATOR FOR PLANT MATERIAL

FIELD OF THE INVENTION

The present invention relates to an apparatus for the impregnation or introduction of a chemical into the tissue of a target plant. In particular, the invention relates to the introduction of herbicide into a leaf or stem of a terrestrial or aquatic plant.

BACKGROUND OF THE INVENTION

Numerous devices have been developed or proposed for applying chemicals, such as herbicides, pesticides, fungicides and fertilisers, onto plants. These range from broad acreage spraying to direct application of a chemical to a target plant. However, spraying methods may be unsuitable where the target plants are aquatic plants or are terrestrial plants that are interspersed with non-target plants. Furthermore, spraying may not be suitable due to wind conditions or where rain may dilute the chemical, such that the concentration on the target plant is ineffective.

As a result, various devices have been proposed in the prior art that comprise direct application of the chemical onto the plant. One example is disclosed in U.S. Pat. No. 4,357,779, to MADDOCK, that describes a chemical applicator comprising a sponge connected to a chemical reservoir, wherein a flow of chemical from the reservoir to the sponge is controlled by a flow control valve.

One of the limitations with the sponge or absorbent pad type applicator is that the pad has a tendency to dry out due to its large surface area that is exposed to the environment. Furthermore, the chemical is still applied onto the surface of the plant, which may only absorb a fraction of the chemical applied, with the remainder being capable of being washed-off, thereby increasing the potential chemical exposure risk for non-target plants and animals.

U.S. Pat. No. 5,724,765, to WEGNER, discloses a herbicide applicator comprising a pair of opposable jaws, each including a herbicide reservoir connected to an absorbent pad by a conduit, and a plurality of needles. When a leaf or stem of a plant is grasped by the jaws, the needles penetrate the surface of a plant and the herbicide flows from the pad into the holes produced in the plant tissue by the needles. The device described in WEGNER however still applies a significant amount of herbicide to the surface of the plant, via the absorbent pads, which poses environmental issues.

The present Inventor has previously proposed an applicator that includes a reservoir and valves that are opened by the action of corresponding piercing members, which was the subject of International Application PCT/AU06/01887. However, it has been found that leakage can still occur through the valves and the piercing member must accurately align a corresponding valve which can be problematic.

It should be appreciated that any discussion of the prior art throughout the specification is included solely for the purpose of providing a context for the present invention and should in no way be considered as an admission that such prior art was widely known or formed part of the common general knowledge in the field as it existed before the priority date of the application. The term 'impregnation' used throughout the specification refers to the application of the chemical into the target plant tissue, in contrast to the application of the chemical to an exterior or outer surface of the target plant tissue.

SUMMARY OF THE INVENTION

In one aspect of the invention, but not necessarily the broadest or only aspect, there is proposed an apparatus to introduce a chemical into a plant tissue of a target plant, including:
a body being graspable by a user; and
an applicator portion attachable to or forming a part of said body, the applicator portion including a reservoir chamber for holding said chemical, and one or more elongate porous piercing elements, in fluid communication or capable of fluid communication, with said reservoir chamber, the porous piercing elements each having a length of greater than 1 mm and being configured to pierce said plant tissue, each of the porous piercing elements comprising a respective shaft and a generally tapered tip, wherein the shaft has a diameter equal to or greater than 0.5 mm, whereby a ratio of diameter of shaft to length of porous piercing element is less than 1:10;
wherein said chemical within the reservoir chamber is drawn or moves into said one or more elongate porous piercing elements, such that as the one or more elongate porous piercing elements penetrate into or through said plant tissue the chemical is applied to an edge of a resultant incision therein.

The present invention therefore provides a porous piercing element that is configured to incise or pierce the plant tissue of the target plant and to carry the chemical into an interior of said target plant. This is in contrast to the absorbent pads of the prior art that apply the chemical predominantly to the exterior of the target plant.

In one form the applicator portion may comprise a first jaw, that is configured to cooperate with a second jaw on the body, wherein said first and/or second jaws are moveable and the plant tissue of the target plant is positionable therebetween, wherein upon closure or partially closure of the first and second jaws, the one or more elongate porous piercing elements piece the plant tissue of the target plant.

The one or more porous piercing elements are in fluid communication with and may be positioned within and extending out from the reservoir chamber when the first and second jaws are in an open position. Alternatively, the one or more elongate piercing elements may be positioned within recesses when the first and second jaws are in an open position to inhibit inadvertent contact or interference with the piercing elements. Such inadvertent contact or interference may occur if a child tries to play with the apparatus. Said recesses may be formed by a compressible member that surrounds the piercing elements or may be formed by a generally rigid member, which is retractable or moveable to permit the piercing elements to extend outwardly therefrom.

In one form the one or more elongate piercing elements only extend into a gap between the first and second jaws at a point just before the first and second jaws are fully closed or are abutting the tissue of the target plant. This means that the jaws can be wide enough to allow for the positioning of the plant tissue, such as a leaf or stem therebetween, but the piercing elements only extend outwardly when the jaws are close enough to inhibit the fingers of a child or user being positioned therebetween.

In a preferred form the one or more elongate piercing elements are in fluid communication with the reservoir chamber by way of a passageway. The one or more elongate piercing elements are preferably surrounded by a circumferential skirt that inhibits inadvertent contact therewith.

Preferably the one or more porous piercing elements are constructed from an absorbent wicking material. Accordingly, the reservoir can be filled with said chemical, which is drawn or impelled from the reservoir chamber by capillary action through the piercing elements to an outer surface thereof, such that it can be applied to the tissue when the piercing elements pierce the tissue of the target plant.

The porous piercing elements may be constructed from a metal or non-metal generally rigid or semi-rigid material.

In one form the porous piercing elements may be constructed from a generally rigid sintered material which acts to wick the chemical from the reservoir chamber to thereby present the chemical on an outer surface of the piecing elements, such that when the porous piercing elements pierce the plant tissue some of said chemical is wiped off on the edges of the incision. This introduction of the chemical into an interior of the plant tissue by way of a new cut or incision, in affect bypasses the normal local or systemic response of the plant to damage, thereby improving chemical uptake by the plant.

The sintered material may be a sintered ceramic, metal, aluminium oxide or silicon carbide. One of the advantages of a generally rigid sintered wick material is that it is both are sharp and durable for repeated use. However, the reader will appreciate that other types of material could be used. For instance, the porous piercing elements may be constructed from a porous thermoplastic material, cellulosic fibres or compressed fibres, such as wood pulp and cotton pulp, synthetic fibres, such as polyesters and polyolefins, superabsorbent polymers, such as polyacrylic acid, or felt.

Preferably the porosity of the porous piercing elements may be configured to deliver the chemical to all the tapered tips and outside of the shaft uniformly via capillary action. The material is also preferably non-drip. The flow rate through the porous piercing elements can be configured for the particular chemical being used. For instance, for more viscous fluids the flow rate can be increased depending upon the material used or the size of the particles of the sintered material used to form the porous piercing elements.

In another form the porous piercing elements comprise a relatively soft wicking material that is reinforced by a relatively rigid support member. The soft wicking material and rigid support member may be laminated or the soft wicking material may envelope an internal hardened rod. In yet another form, each piercing element may include a hardened tip.

The one or more porous piercing elements may be connected to or formed on a base plate of the same material. The base plate is configured to hold the porous piercing elements in place within the applicator portion. The porous piercing elements and base plate may be unitary in construction.

In one form the porous piercing elements may be elongate members having a length of between 1 mm and 5 mm and preferably 3 mm. The porous piercing elements may comprise a shaft that extends outwardly from the base plate and a tapered tip for incising the plant tissue. In one form the shaft may be 1 mm in length and the tapered tip may also be 1 mm in length. The diameter of said shaft may be between 0.5 mm and 2 mm and is preferably 1.5 mm.

The length of the porous piercing elements may be uniform or there may be a plurality of longer spikes and a plurality of shorter spikes or spikes or various lengths. In this way, the porous piercing elements are able to pierce the leaf of the plant notwithstanding its thickness, width or length.

The porous piercing elements or the tapered tip thereof may be generally cone shaped having a single curved face, or alternatively the tapered tip may include at least one face and a cutting edge. The tapered tip may include a plurality of generally planar faces and intermediate cutting edges. In one form the tapered tip may be generally pyramid shaped with four generally planar faces and four intermediate cutting edges. The cutting edges assist in the incision of the plant tissue and the generally planar faces provide a large surface area for application of the chemical thereto. The shaft of the porous piercing element may be generally cylindrical having a circumferential outer face, or have a polygon shaped cross sectional profile, such as a square shape, or the shaft may be tapered.

The sharpened tip may only penetrate the plant tissue a short distance before the shaft, which has a larger diameter, comes into contact with the incision. The short length of the tapered tip also means that it will be unlikely to penetrate human skin.

The spacing of the plurality of porous piercing elements may be between 0.5 mm and 5 mm, and may preferably be 1.5 mm. In this way, the porous piercing elements are able to pierce plant tissue however are inhibited from piercing human issue if the applicator portion comes into contact with a user's hand or foot because of the proximity of the adjacent porous piercing elements. The spacing works in a similar fashion to a bed of nails wherein the human tissue in not pierced even though an individual nail would pierce it. On the other hand, plant tissue, such as a leaf, is easily incised by the porous piercing elements when the jaws are moved together or the applicator portion is pushed down onto a prostrate weed.

A resiliently deformable member may surround the porous piercing elements. In one form the resiliently deformable member is a compressible foam pad. In another form the resiliently deformable member is a circumferential flexible skirt that surrounds the porous piercing elements. At rest the porous piercing elements are contained within or surrounded by the resiliently deformable member such as the compressible foam or flexible skirt, and in use the porous piercing elements can be extended outwardly therefrom. The compressible foam may be preferably a closed cell foam, wherein the chemical is inhibited from being drawn out of the porous piercing elements thereinto. The flexible skirt may be constructed from a natural or synthetic rubber material.

An ejector member may be used to push the leaf off the porous piercing elements. In one form the compressible foam pad that covers or surrounds the porous piercing elements or the flexible skirt acts as the ejector member. The foam pad or skirt may be overmoulded to the apparatus or attached with adhesive.

In another form a metal dome spring or plastic spring element or sprung plate may be used to ensure the leaf is detached from the porous piercing elements before the apparatus is withdrawn from around the leaf.

In one form the second jaw that forms an opposing surface to the applicator portion includes a compressible member such as but not limited to a foam pad. In this way when the first and second jaws are brought together the plant tissue is held between opposing foam pads or a foam pad and flexible skirt. This assists to hold the plant material in place so that the porous piercing elements can effectively pierce the plant tissue. As the porous piercing elements come into contact with the compressible foam pad on the opposing surface, when the first and second jaws are moved together, reversibly collapsible depressions or slots are formed in the compressible foam pad that correspond to the porous piercing elements. The portions of the compressible foam pad not impacted by the porous piercing elements act to support the back of the leaf or plant tissue to assist with the penetration of the porous piercing elements. In another form the compressible member is a portion of multiple hook material used in hook and loop fasteners. Wherein the flexible hooks are able to compress or move to accommodate the tapered ends of the piercing elements while still supporting the back of the leaf.

In a preferred form the opposing surface includes a plurality of parallel channels that align the porous piercing elements, wherein the ridges between the channels act on the leaf to assist in the incision thereof.

Due to the configuration of the porous piercing elements, which have multiple pores and pathways, any potential clogging with debris or plant residue will not adversely affect the efficiency of the porous piercing elements. The compressible foam pad may also assist in wiping the surface of the porous piercing elements clean, although this is not seen by the Inventor as being essential due to the nature of the material forming the porous piercing elements.

When not in use the first and second jaws may be brought into a partially closed arrangement such that the compressible foam pads abut or the flexible skirt abuts the opposing surface. This abutment acts to seal or at least partially seal the porous piercing elements to inhibit evaporation or escape of the chemical from the apparatus.

A respective lip may surround the compressible foam pads, wherein when in the partially closed arrangement the respective lips abut to thereby create a further barrier to movement of the chemical.

A vent groove, port or one-way valve in the porous member or a tank that forms the reservoir chamber, may be used to permit air to move out during filling of the reservoir chamber and/or to enter the tank as the liquid wicks out therefrom, to inhibit the formation of a vacuum.

In one form the applicator portion or a part thereof is detachable from said body. The detachable part may comprise or be attached to the first or second jaws. The detachable part may comprise the tank, which form the reservoir chamber, piercing elements and a foam pad or skirt. A clip or locking means may be used to secure the detachable part to the first or second jaw during use. Alternatively, the detachable part may frictionally engage the first or second jaw.

The locking member may comprise a sleeve that slidably engages a part of the body and is configured to both hold the applicator portion is place, and may act to hold the jaws of the applicator portion closed when not in use, whereby the piercing elements are concealed to inhibit unauthorised tampering or drying out thereof.

In this way, the reservoir chamber, piercing elements and foam pad/s or skirt can be replaced when the tank is empty or the piercing elements are damaged, wherein the body of the apparatus can be reused multiple times. Alternatively, for a single use apparatus the porous piercing elements can be detachable to assist with recycling of the device.

The reservoir chamber may be formed in a clear plastic tank that is ultrasonically welded or otherwise attached to the body or applicator portion. The clear plastic tank enables a user to identify how much chemical remains within the reservoir chamber. The porous piercing elements may be insert moulded into the applicator portion or tank. Alternatively, the porous piercing elements could be clamped in place or held using an interference fit, adhesive, ridge, etc. In one form the tank may include internal ribs or ridges to hold the base plate and porous piercing elements in place once assembled.

In another form the applicator portion is positioned or attached at an end of an elongate handle, such that in use the one or more porous piercing elements are configured to extended downwardly from the applicator portion to pierce the plant tissue of a target plant that has a generally prostrate growth habit.

In one form the applicator portion comprises a tapered tank that frictionally engages a recess in the end of said elongate handle, the tapered tank being attached to a support member that accommodates the porous base plate and porous piercing elements, such that the porous piercing elements depend from the base plate, a resiliently deformable member is attached to an underside of the support member and surrounds the porous piercing elements, such that when downward pressure is applied to an underlying target plant the porous piercing elements extend out from within the resiliently deformable member to thereby pierce the plant tissue of the target plant. Alternatively, the applicator portion or cartridge may be connected to the handle by way of cooperating bayonet fittings, cooperating threads, magnetic coupling or any other attachment means.

The apparatus may also include a guide member that guides the target tissue into the correct position between the opposing jaws to assist in the efficient use of the device. This may be useful where the apparatus is being used by a person with limited mobility, or where the apparatus is connected to, or includes, an extendable handle to treat a plant tissue that is located at a height above the ground and which is out of arms reach.

The apparatus may further include finger or hand guard/s that prevents the target tissue coming into contact with the hand or fingers of the user. This may be important where the apparatus is being used to treat brambles, thistles or stinging nettles. The guard/s is/are forward of the finger grips on the outer surface of the opposing jaws and extends outwardly both sides of the apparatus. The guard/s may be integral with the jaws or may be attachable thereto.

A cap may be reversibly attached over a part of the applicator portion to prevent evaporation of the chemical off the porous piercing elements and to protect them when not in use. The cap may include a locking device to prevent unauthorised tampering, for instance a 'child lock' could be used to prevent children from coming into contact with the potentially hazardous chemical contained within the apparatus. Where the apparatus includes opposing jaws the cap can be clamped over the jaws when they are in the abutting arrangement to effectively hold the jaws together for storage. Alternatively, where the apparatus comprises an elongate handle and depending applicator portion the cap may simply clip over the end of the applicator portion.

The reader will appreciate that since the porous piercing elements contain the chemical, very little is applied to the outer surface of the target plant during delivery. In this way, the potential for wash-off of the chemical is reduced and the chemical is applied to interior of the target plant, where it is more likely to be absorbed and therefore have the greatest efficacy.

The one or more porous piercing elements extend out from or are in fluid communication with the reservoir chamber, such that the one or more porous piercing elements normally contain a portion of the chemical within its pores for application to said plant tissue.

The use of multiple small porous piercing elements makes targeting of the plant, such as a weed much easier, as there is no need for careful alignment of the apparatus for thin leaves.

Furthermore, the total perimeter of the piercings is increased since there are multiple small holes. The Inventor envisages that this should lead to a greater take-up of the chemical by the leaf or other plant tissue.

A thin layer of elastomer may overlay the tips of the porous piercing elements to seal the unit during filling and transport, prior to use. The thin layer of elastomer will be pierced during first use. Alternatively, an adhesive film or foil may overlay the tips of the porous piercing elements, which are either pierced on first use or may be peeled off by the user prior to use.

The piercing elements are preferably configured to incise the leaf without tearing or cutting away any portion of leaf, since this may affect the uptake of the chemical.

In another aspect of the invention there is proposed a device for applying a chemical to a plant including at least one piercing member that substantially comprises said chemical, wherein the at least one piercing member is dissolvable or otherwise liquefiable for application to said plant.

The at least one piercing member being in a crystallised form that is dissolvable or otherwise liquefiable by an activating liquid or substance or plant enzyme or as a result of other chemical reaction.

The activating liquid or substance may be applied to the at least one piercing member from the chemical reservoir. Accordingly, the chemical to be applied to the plant is not contained within the chemical reservoir, as previously discussed, rather the activating liquid or substance is held with the reservoir in a similar fashion, as previously discussed with respect to the chemical, wherefrom it can be applied to the porous piercing member/s to dissolve or otherwise liquefy at least a part of the porous piercing member/s, such that at least a portion of the chemical is in a form that can be applied to the plant material.

In one form the liquid is water that is applied to the at least one piercing member to causes an outer layer to be liquefied so that it can be applied to the plant tissue as the at least one piercing member pierces the plant tissue.

The activating liquid may be applied to the leaf or plant prior to piercing by the piercing element. For instance, this could be achieved using a damp sponge pad of the applicator or a spray device or simply applying water to a plant using a garden hose.

The crystallised at least one piercing member may be a glyphosate (N-(phosphonomethyl)glycine).

The dissolvable at least one piercing member may include a carrier or bonding agent that in one form solidifies the chemical and allows for it to be liquefied under a desired condition.

In another form an active or inactive matric may be used to hold the chemical therein.

The at least one piercing member may be at least partly porous or may be generally solid but which allows an activating liquid or substance to penetrate thereinto.

In still another aspect of the invention there is proposed a method of applying a chemical to plant tissue of a target plant or plants, using a device with one or more porous piercing elements having respective lengths greater than 1 mm and being in fluid communication with a reservoir chamber, each of the porous piercing elements comprising a respective shaft and a generally tapered tip, wherein each shaft has a diameter of equal to or greater than 0.5 mm and a ratio of diameter of shaft to length of porous piercing element is less than 1:10, including the steps of:
a) filing said reservoir chamber with a chemical, wherein the chemical is drawn or moves into the one or more porous piercing elements;
b) passing the one or more porous piercing elements into or through said plant tissue of a first target plant whereby the chemical is applied to an interior of the plant tissue or side of an incision therein;
c) withdrawing the one or more porous piercing elements from the plant tissue; and
d) repeating steps b) and c) to treat said first target plant or a subsequent target plant or plants.

The plant tissue is pierced to assist with the uptake of the chemical by the target plant or plants. For instance, the cuticle of a leaf may be waxy, or the stem of a weed may be woody, which would all pose a barrier to absorption of the chemical. Therefore, it is essential to the present invention that the target tissue is pierced so that a micro-dose of chemical can be used while still providing efficacy.

The reader should appreciate that the term 'chemical' used throughout the specification should be given its broadest definition. In one form the chemical being applied is selected from a group containing, but not limited to, insecticides, fertilisers, trace elements, nutrients, inoculants, herbicides (i.e. glyphosate), fungicides, growth regulators, genetic material, hormones, pheromones, or any other form of chemical that can be applied to a target plant to kill the plant or improve health or treat/inhibit/inoculate against a disease, infection or parasitism.

BRIEF DESCRIPTION OF THE DRAWINGS

The accompanying drawings, which are incorporated in and constitute a part of this specification, illustrate an implementation of the invention and, together with the description and claims, serve to explain the advantages and principles of the invention. In the drawings.

FIG. 7 is an exploded view of the chemical applicator of FIG. 1 illustrating the tank and base/piercing elements;

FIG. 8a is an underside perspective view of the base/piercing elements of FIG. 7;

FIG. 8b is another embodiment of the piercing elements of the present invention;

FIG. 9 is a perspective view of the chemical applicator of FIG. 1 in a closed configuration engaging a leaf;

FIG. 10 is a perspective view of the leaf of FIG. 9 illustrating the holes created in the leaf by the piercing elements;

FIG. 11 is a side view of the chemical applicator and leaf of FIG. 9;

FIG. 24 is a cross-sectional view through E-E of the chemical applicator of FIG. 22 illustrate the treatment of a leaf of a prostrate plant;

FIG. 25 is a perspective view of the lower end of the chemical applicator of FIG. 20;

FIG. 26 is a perspective view of the applicator portion and handle of FIG. 25 in a detached configuration;

FIG. 34b is a side view of the base/piercing elements of FIG. 34a;

FIG. 35b is a side view of the base/piercing elements of FIG. 35a;

FIG. 40a is a cross-sectional view through G-G of the chemical applicator of FIG. 36 in a first position;

FIG. 40b is an enlarged view of the pin of FIG. 40a;

FIG. 41a is a cross-sectional view through G-G of the chemical applicator of FIG. 36 in a second position;

FIG. 41b is an enlarged view of the pin of FIG. 41a, illustrating the flow of chemical;

FIG. 42a is a cross-sectional view through G-G of the chemical applicator of FIG. 36 in a third position;

FIG. 42b is an enlarged view of the pin of FIG. 42a;

FIG. 52 is a perspective view of the chemical applicator of FIG. 48 illustrating the removable canister;

FIG. 53 is a side view of the chemical applicator of FIG. 52;

FIG. 54 is an underside perspective view of the removable canister of FIG. 52;

FIG. 55 is a cross-sectional view of the removable canister of FIG. 54 through K-K;

FIG. 56 is a top view of the chemical applicator of FIG. 48 engaging a leaf;

FIG. 57 is a cross-sectional view of the chemical applicator of FIG. 56 through L-L;

FIG. 58 is a perspective view of the base/piercing element of FIG. 48;

FIG. 59 is a top view of the base/piercing element of FIG. 58;

FIG. 60 is a cross-sectional view of the base/piercing element of FIG. 58 through M-M;

FIG. 61 is a perspective view of a seventh embodiment of the chemical applicator;

FIG. 62 is a cross-sectional view of the chemical applicator of FIG. 61 through N-N in an open position;

FIG. 63 is a side view of the chemical applicator of FIG. 61;

FIG. 64 is a cross-sectional view of the chemical applicator of FIG. 61 through N-N in a closed position;

FIG. 65 is an exploded view of the removable canister of the chemical applicator of FIG. 61; and FIG. 66 is a partial side cross sectional view of the elastomeric pad, spikes and leaf ejector of FIG. 64.

DETAILED DESCRIPTION OF THE ILLUSTRATED AND EXEMPLIFIED EMBODIMENTS

Figure 1:
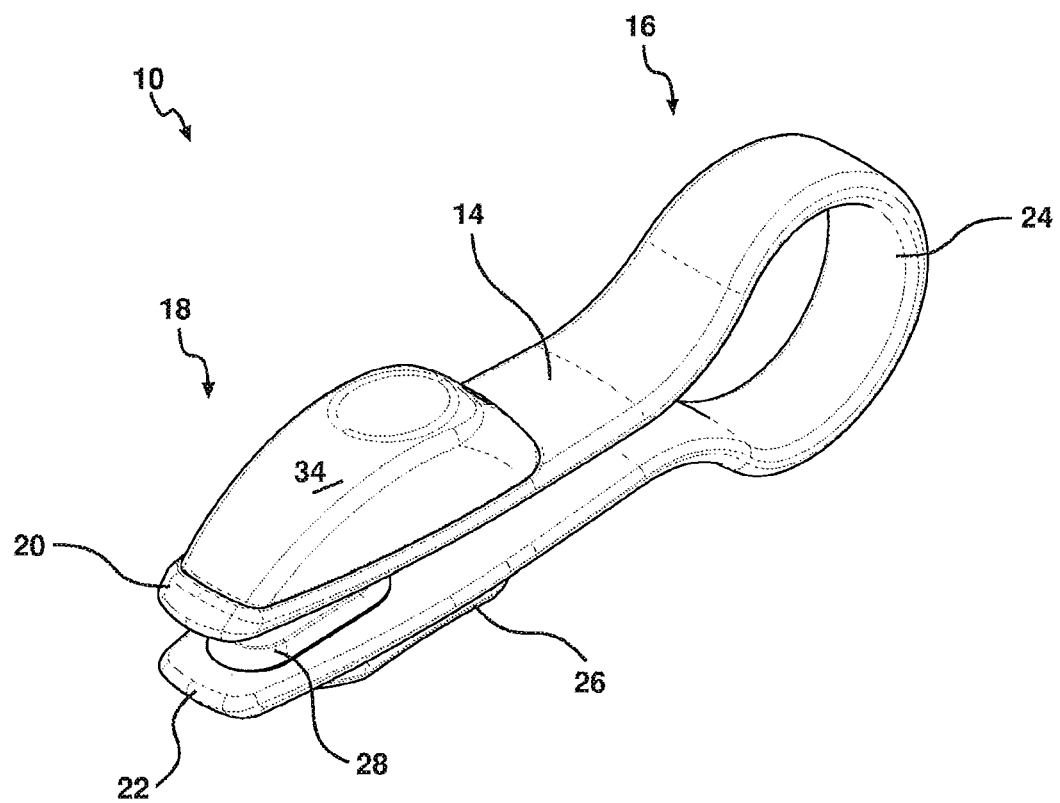
FIG. 1 is a perspective view of a first embodiment of the chemical applicator of the present invention.

Similar reference characters indicate corresponding parts throughout the drawings. Dimensions of certain parts shown in the drawings may have been modified and/or exaggerated for the purposes of clarity or illustration.

Referring to the drawings for a more detailed description, there is illustrated an apparatus 10 for delivery of a chemical into a tissue of a target organism, demonstrating by way of examples, arrangements in which the principles of the present invention may be employed. The reader should appreciate that the apparatus 10 will be primarily described with reference to applying a chemical to the leaf 12 of a terrestrial plant, however it should be appreciated that the invention is not limited to this particular application and could also be used in relation to an aquatic plant or other organism.

Figure 2:
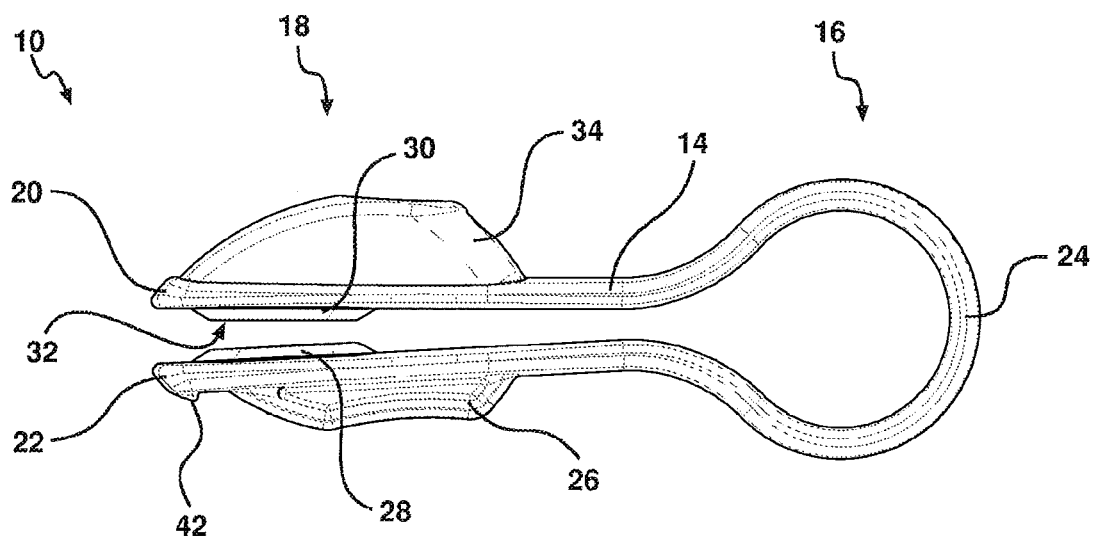
FIG. 2 is a side view of chemical applicator of FIG. 1.
Figure 3:
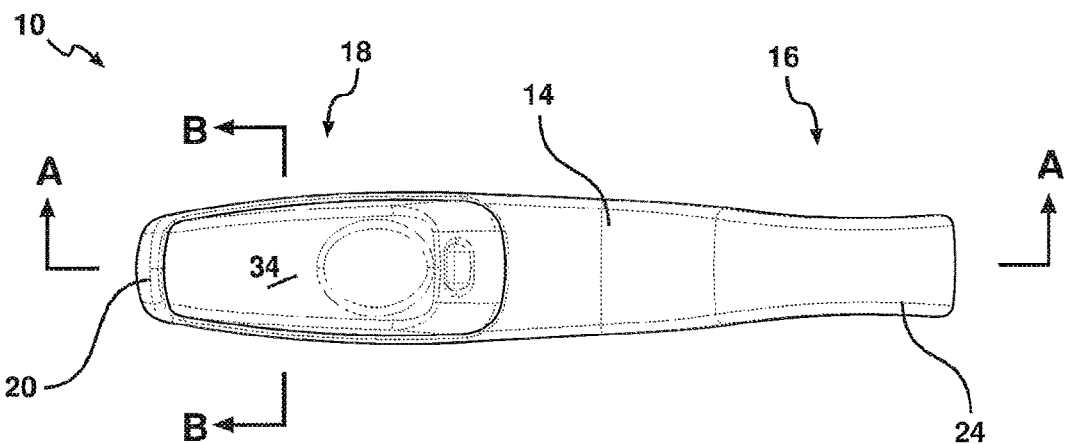
FIG. 3 is a top view of the chemical applicator of FIG. 1.

Turning to FIGS. 1 to 3 there is illustrated one embodiment of the apparatus 10, comprising a body 14 having a hinge portion 16 and an applicator portion 18. The term applicator portion used throughout the specification means the portion that is used to hold the chemical and apply it to the plant tissue. It should be appreciated by the reader that the hinge portion is still actively involved in the process however the phases are used simply to define different sections of the body 14. The applicator portion 18 in the present embodiment comprise first jaw 20, that is configured to oppose second jaw 22 of the body 14. Although the hinge portion 16 illustrated comprises a curved hinge 24 that is unitary with the second jaw 22, other types of hinged members may be used and the first and second jaws 20, 22 may be separate and joined by way of a separate hinge member (not shown).

The curved hinge 24 is shaped such that the first and second jaws 20, 22 are biased apart to provide sufficient space for the positioning of a leaf or other plant material between the jaws 20, 22 when at rest. As the jaws 20, 22 are brought together elongate porous piercing elements 32 incise the leaf 12 to thereby treat the target plant with the chemical.

The second or lower jaw 22 includes a lower finger support 26 on or attached to an outer surface. A foam pad 28 is located on an inner surface of the second jaw 22 opposing a foam pad 30 on or attached to an inner surface of the first jaw 20. The foam pads 28, 30 may be over moulded to the respective jaw 20 or 22, or they may be attached by way of an adhesive or may be welded thereto.

As will become clear the foam pad 28 is preferably a closed cell foam material and is generally uniform. The foam pad 30 is also constructed from a closed cell foam material however includes openings 31 to accommodate the elongate porous piercing elements 32. The reader will however appreciate that the elongate porous piercing elements 32 may simply be pushed through the foam pad 30 to thereby create openings and the openings do not need to be manufactured in the foam pad 30 prior to use.

Figure 4:
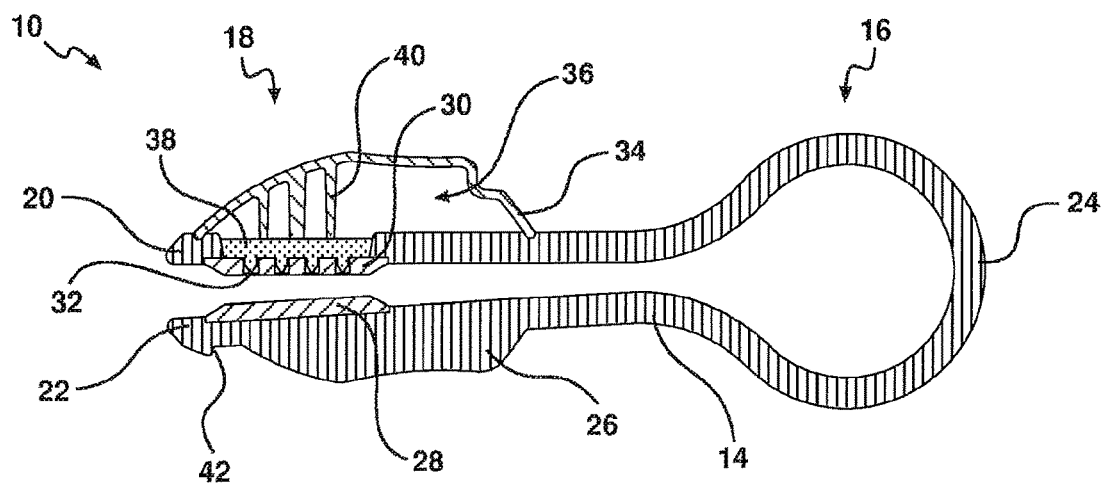
FIG. 4 is a cross-sectional view through A-A of the chemical applicator of FIG. 3.

In the present embodiment, a tank 34 is attached to an outer surface of the first jaw 20 to thereby form a reservoir chamber 36, as illustrated in FIG. 4, which is configured to hold the chemical for applying to the target plant. The elongate porous piercing elements 32 are connected to a porous base 38, as illustrated in FIG. 4. The porous base 38 is held in position by ribs or support members 40.

As further illustrated in FIG. 4 the lower jaw 22 includes a latch 42 for engagement with a cap 44, as will be discussed with respect to FIGS. 14 to 19.

Figure 5:
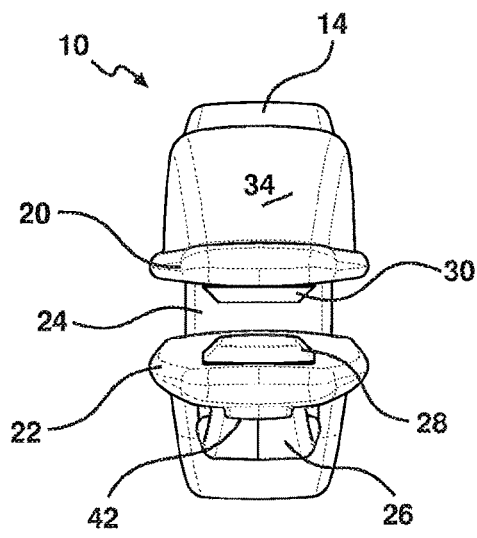
FIG. 5 is a front view of the chemical applicator of FIG. 1.
Figure 6:
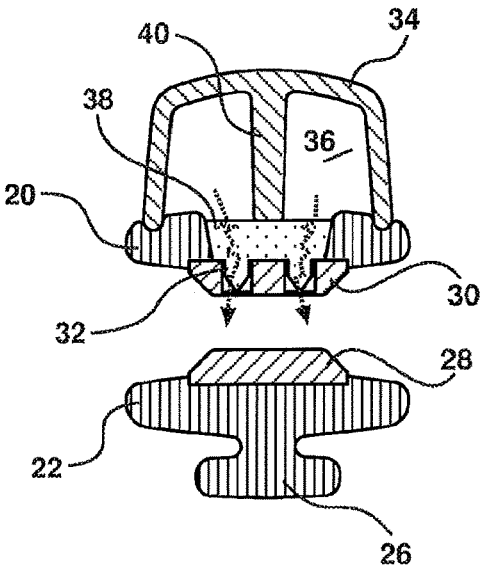
FIG. 6 is a cross-sectional view through B-B of the chemical applicator of FIG. 3.
Figure 12:
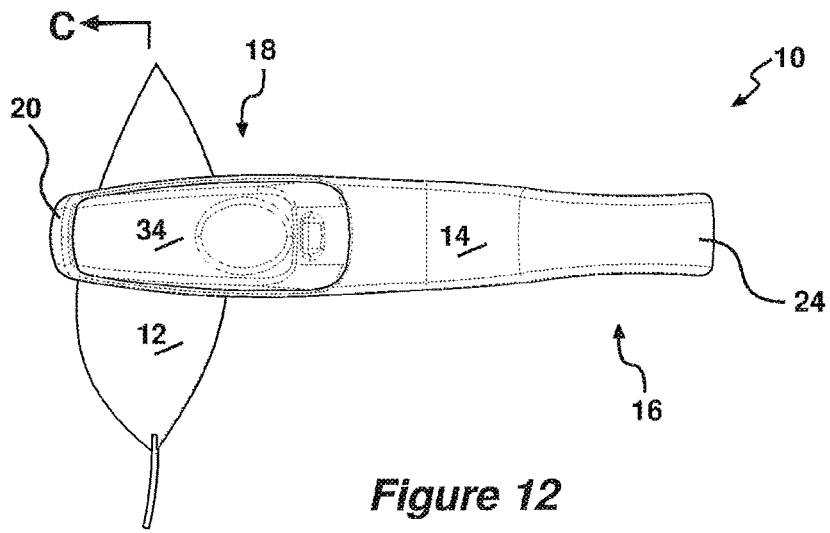
FIG. 12 is a top view of the chemical applicator of FIG. 9 engaging a leaf.

FIGS. 5 and 6 illustrate the front view of the apparatus 10 showing the configuration of the opposing foam pads 28 and 30 and the elongate porous piercing elements 32 and base 38. FIG. 6 illustrates how the reservoir chamber 36 containing the chemical is in fluid communication with the porous base 38 such that the chemical is able to move in the direction of the broken arrows from within the reservoir chamber 36, through the porous base 38 and porous piercing elements 32, such that it can escape from the outer surface of the porous piercing elements 32. The skilled addressee will appreciate that the chemical will be presented on or adjacent the outer surface of the porous piercing elements 32 such that when it pierces the tissue of the target plant the chemical is wiped off thereonto.

The reader will also appreciate that the movement of the chemical may simply rely upon capillary action wherein the chemical is able to flow through the narrow spaces without an external force being applied, however, the tank 34 may also be pressurised to impel the chemical into the porous piercing elements 32. The surface tension of the particular chemical will inhibit it from dripping out of the pores of the porous material.

FIG. 7 illustrates the tank 34 and the porous base/piercing elements, collectively referred to as the porous elements 32, 38, separated from the first jaw 20. The porous elements 32, 38 are configured to be positioned within aperture 46, such that the elongate porous piercing elements 32 engage openings 31 in the foam pad 30, or simply impinge upon the foam pad 30 such that piercing elements 32 form openings therethrough. The tank 34 is configured to engage recess 48, such that it provides a leak proof seal. The tank 34 may be welded, glued or otherwise fixed to the first jaw 20.

It is envisaged that the porous elements 32, 38 will be constructed from a sintered ceramic, metal, aluminium oxide or silicon carbide material. However other material could be used as the wick to draw the chemical out from within the reservoir chamber 36 such that it is presented on an outer surface for application to a plant tissue. An intermediate porous member (not shown) may also be included between the reservoir chamber 36 and porous base 38 or a passageway or passageways may lead between the reservoir chamber 36 and porous base 38.

FIG. 8a illustrates one embodiment of the porous elements 32, 38, wherein the elongate porous piercing elements 32 are unitary with the porous base 38. The porous piercing elements 32 include a shaft 50 that extends outwardly from the base 38 and a tapered tip 52 for assisting in the incising of the plant tissue. The tapered tip 52 may be generally cone shaped having a single curved face as illustrated in FIG. 8a, or alternatively the tapered tip 52 may include generally planar faces 54 with intermediate cutting edges 56 and the shaft 50 may be generally cube shaped. The reader should also appreciate that the shaft may be tapered.

The spacing of the plurality of porous piercing elements 32 as illustrated in FIGS. 8a and 8b is approximately 1.5 mm. In this way, the porous piercing elements 32 are able to pierce plant tissue, however are inhibited from piercing human tissue, due to the proximity of the adjacent porous piercing elements 32, if the applicator portion comes into contact with a user's hand or foot.

In use, the tissue of the target plant such as a leaf 12, as illustrated in FIGS. 9 to 13b, is positioned between the first and second jaws 20, 22. The user then applies pressure with their fingers 58 and thumb 60 to bring the jaws 20, 22 together against the bias of the hinge 24. Upon closing of the first and second jaws 20, 22 the elongate porous piercing elements 32 piece the leaf 12. As the pressure from the user's hand is reduced the jaws 20, 22 spring apart and the apparatus 10 can be removed from around the leaf 12. FIG. 10 illustrates the holes 62 that are formed in the leaf 12. As the reader will appreciate, the chemical is presented on the outer surface of the porous piercing elements 32, such that as they incise the leaf 12, some of the chemical is wiped off on the edges of the incisions 62.

Figure 13A:
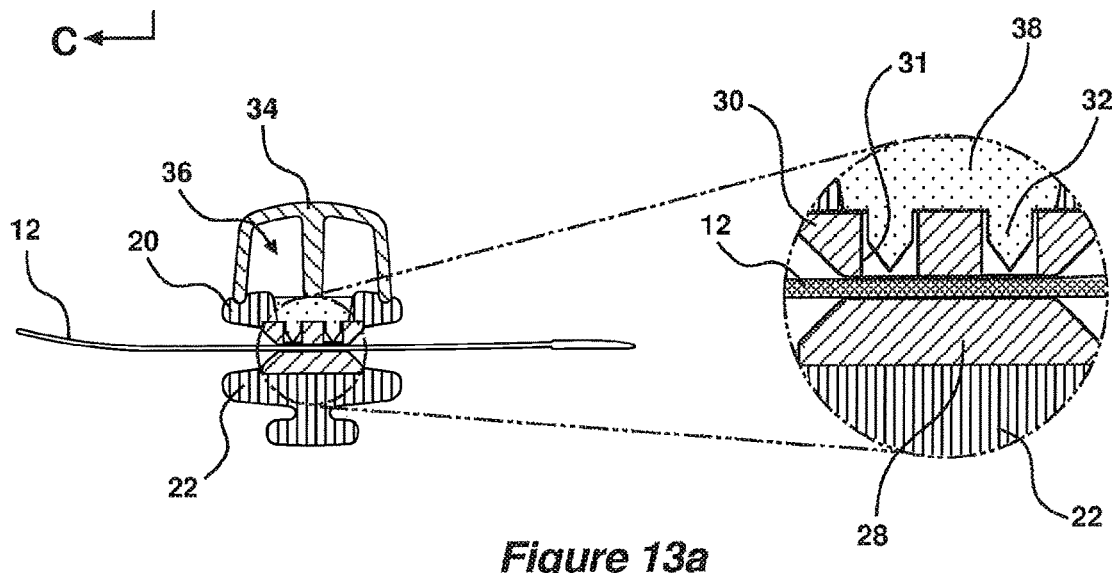
FIG. 13a is a front cross-sectional view through C-C of the chemical applicator and leaf of FIG. 12 as the foam pads contact the leaf.
Figure 13B:
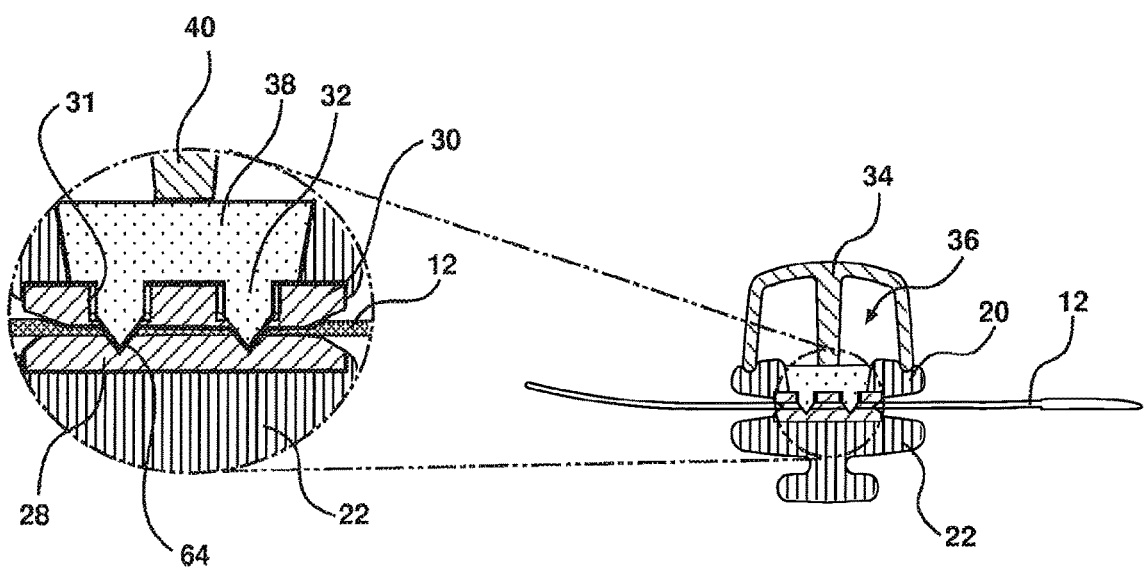
FIG. 13b is a front cross-sectional view through C-C of the chemical applicator and leaf of FIG. 12 as the piercing elements incise the leaf.

FIG. 13a illustrates the leaf being positioned between the jaws 20, 22 which have been moved toward each other such that the foam pads 28, 30 touch the outer surface of the leaf 12. As the jaws 20, 22 are brought closer the foam pads 28, 30 are compressed, as illustrated in FIG. 13b, such that the porous piercing elements 32 extend out from within openings 31 and incise the leaf 12. The reader will appreciate that the leaf 12 is supported by the foam pad 28 to assist in the incision of the leaf. Furthermore, the foam pad 28 is compressible such that depressions 64 are formed in the upper surface to accommodate the porous piercing elements 32. This ensures that the porous piercing elements 32 pass completely through the leaf 12 to provide the greatest delivery of chemical to the edges of the incision 62.

When not in use the first and second jaws 20, 22 are brought together such that the compressible foam pads abut. A cap 44, as illustrated in FIGS. 14 to 19, is then reversibly attached over part of the applicator portion 18 to thereby hold the jaws 20, 22 together. The cap 44 inhibits unauthorised tampering with the device and also assists in inhibiting evaporation of the chemical off the porous piercing elements 32 when not in use.

Figure 14:
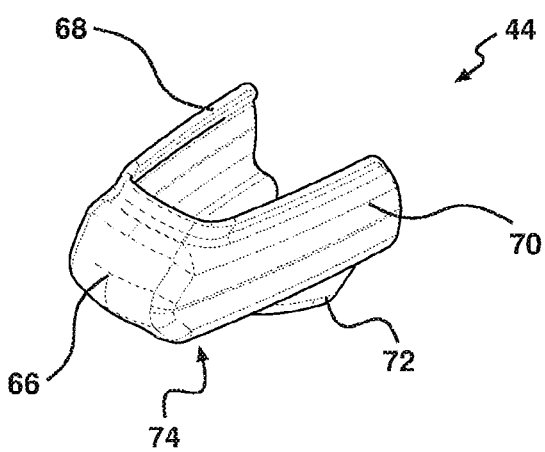
FIG. 14 is a perspective view of one embodiment of a safety cap of the present invention.
Figure 15:
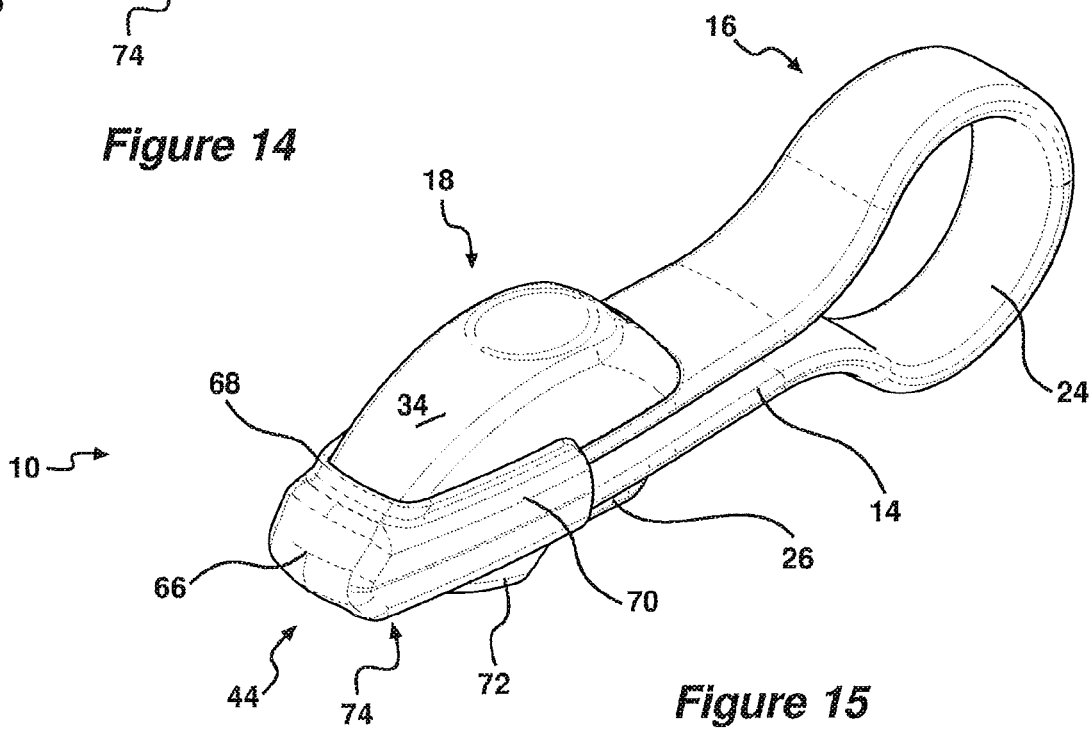
FIG. 15 is a perspective view of the safety cap of FIG. 14 engaging the chemical applicator of FIG. 1.
Figure 16:
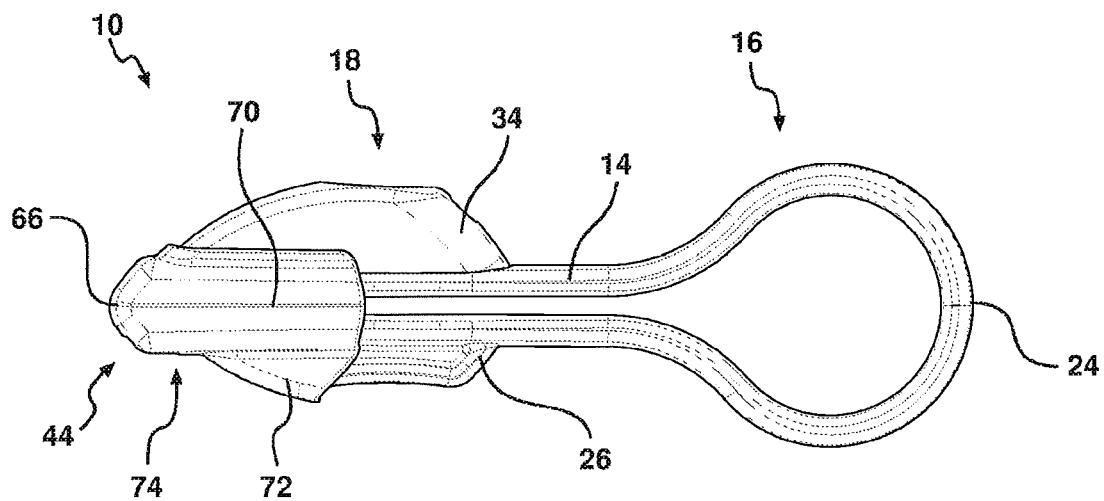
FIG. 16 is a side view of the safety cap and chemical applicator of FIG. 15.
Figure 17:
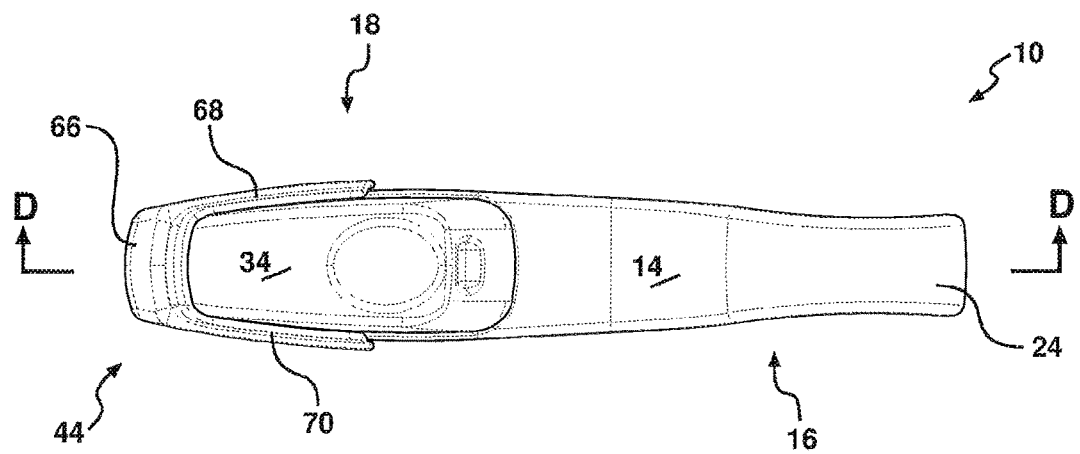
FIG. 17 is a top view of the safety cap and chemical applicator of FIG. 15.
Figure 18:
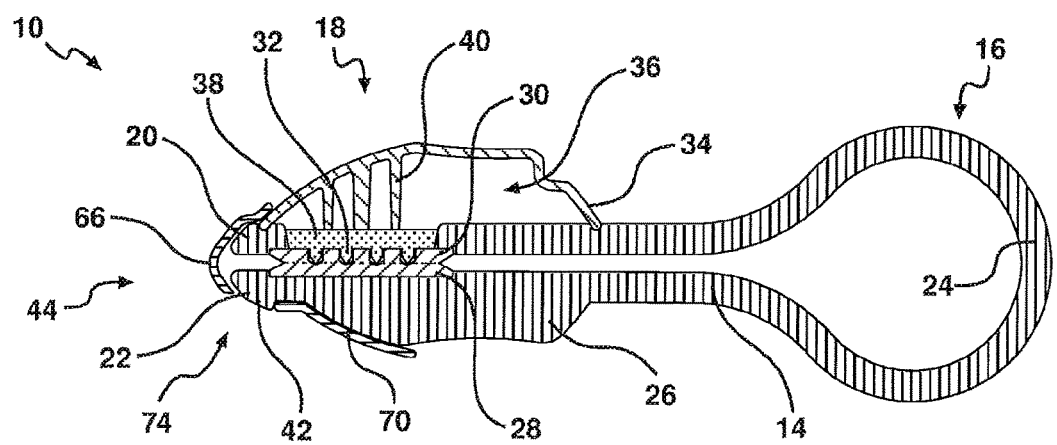
FIG. 18 is a cross-sectional view through D-D of the chemical applicator and safety cap of FIG. 17 illustrating a latch for retaining the safety cap.
Figure 19:
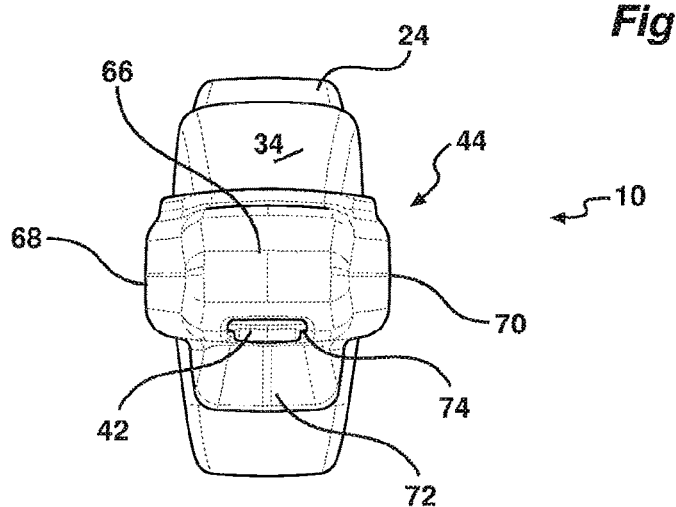
FIG. 19 is a front view of the safety cap and chemical applicator of FIG. 15.
Figure 21:
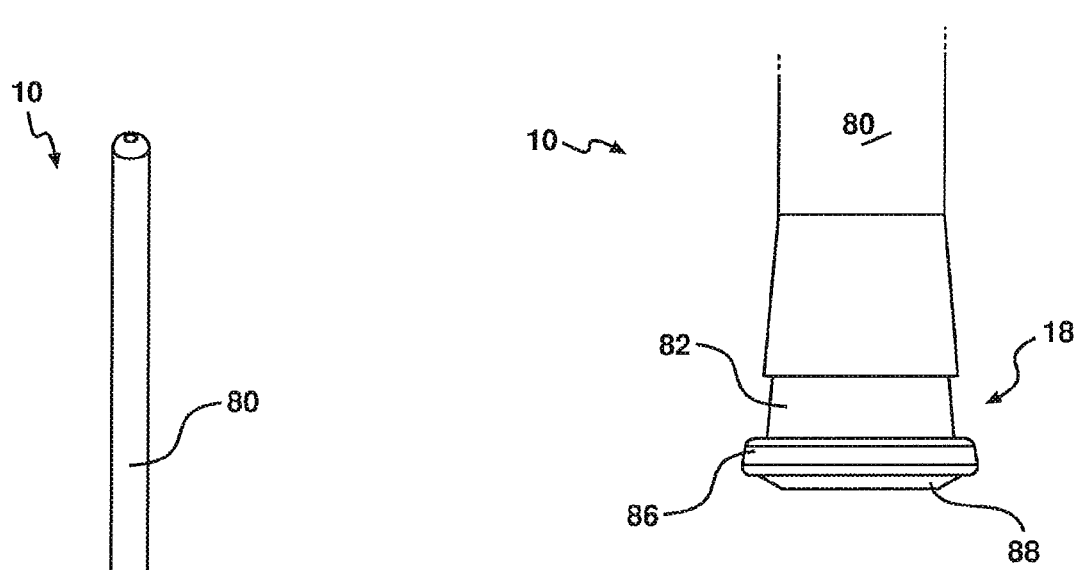
FIG. 21 is a side view of the applicator portion of the chemical applicator of FIG. 20.

As illustrated in FIG. 14, the cap 44 includes a front portion 66, rearwardly extending sides 68, 70 and an underside 72. The underside 72 includes a hole 74, as illustrated in FIGS. 18 and 19, for engagement by the latch 42. The latch 42 acts to hold the cap 44 in place as illustrated in FIG. 15, against unauthorised removal. For instance, a child lock system could be used, such as a double press being required to disengage the latch, or any other type of locking system could be used.

Figure 20:
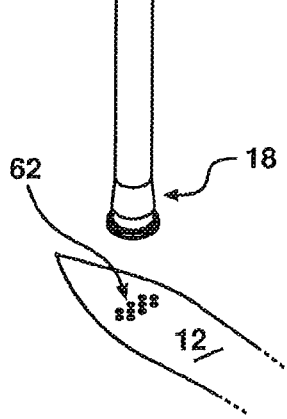
FIG. 20 is a perspective view of a second embodiment of the chemical applicator of the present invention being used to treat a plant having a prostrate growth habit.

In another embodiment as illustrated in FIGS. 20 to 26 the applicator portion 18 is attached to an end of a handle 80, such that in use the one or more porous piercing elements 32 are configured to be extended downwardly to pierce the plant tissue of a target plant that has a generally prostrate growth habit, as illustrated in FIG. 20.

Figure 22:
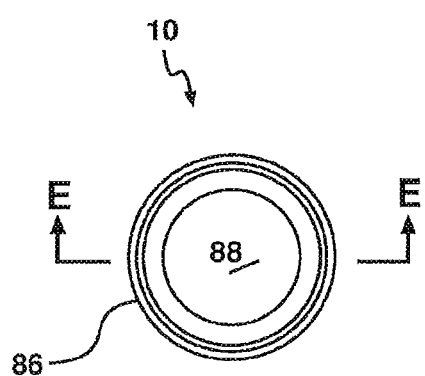
FIG. 22 is an underside view of the applicator portion of FIG. 21.
Figure 23:
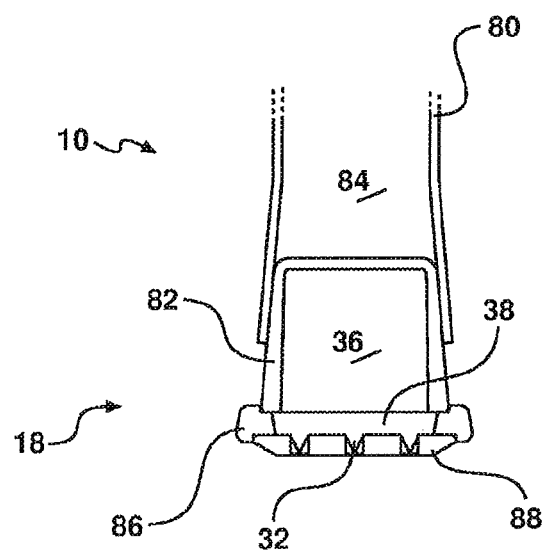
FIG. 23 is a cross-sectional view through E-E of the chemical applicator of FIG. 22.
Figure 27:
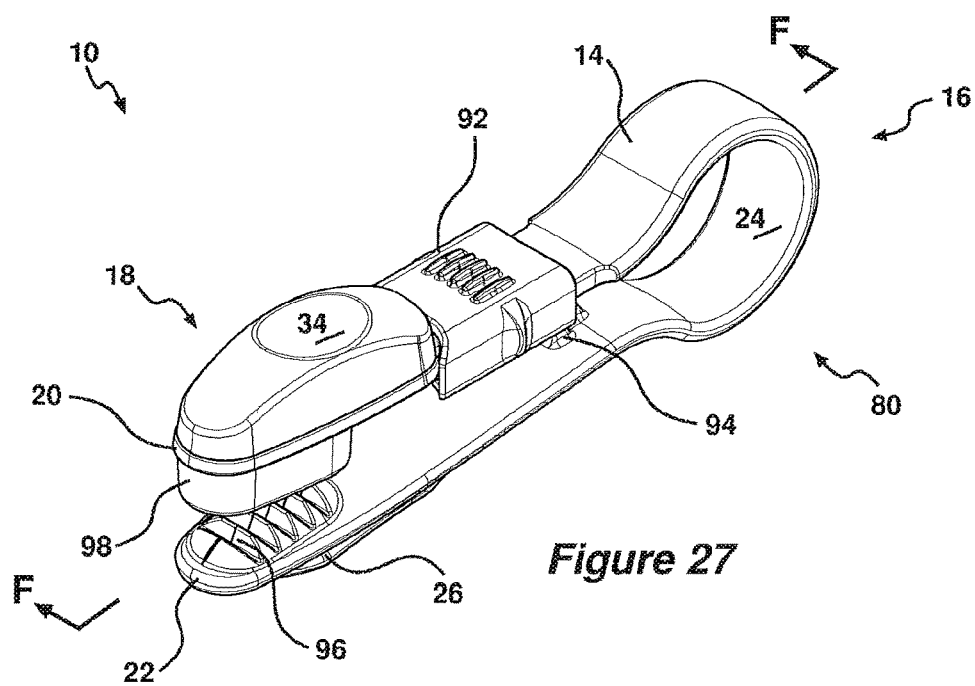
FIG. 27 is a perspective view of a third embodiment of the chemical applicator of the present invention.
Figure 28:
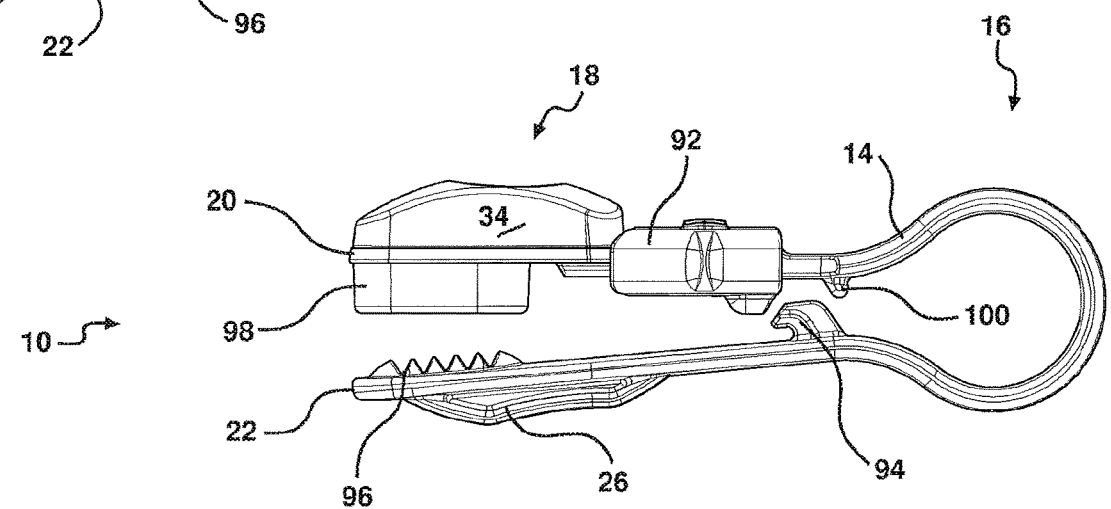
FIG. 28 is a side view of the chemical applicator of FIG. 27.

As illustrated in FIG. 23, the applicator portion comprises a tapered tank 82 that frictionally engages a recess 84 in the end of the elongate handle 80. The tapered tank 82 holds the majoring of the chemical when full and is attached to a support member 86. The support member 86 accommodates the porous base 38 and porous piercing elements 32, such that the porous piercing elements 32 depend from the base 38. A resiliently deformable member 88, in one form being a closed cell foam pad, is attached to an underside of the support member 86 and surrounds the porous piercing elements 32. As shown in FIG. 22 the porous piercing elements 32 are concealed within the closed cell foam pad 88 when not in use.

When a user applies downward pressure, as indicated by the solid arrow in FIG. 24, the foam pad 88 is compressed against the leaf 12 that is resting on the ground 90 and the porous piercing elements 32 extend therefrom to pierce the leaf 12 of the prostrate plant. Once the downward pressure is removed the resiliently deformable foam pad 88 expands back to its original size which assists to push the leaf 12 off the porous piercing elements 32.

As illustrated in FIGS. 25 and 26, the applicator portion 18 can be removed from the end of the handle 80 when the reservoir chamber 36 is empty. In this way, the same handle 80 can be reused by simply replacing the applicator portion 18 or part thereof. A cap (not shown) may cover the underside of the applicator portion 18 when not in use.

FIGS. 27 to 33b illustrate another embodiment of the apparatus 10 wherein the applicator portion is in the form of a detachable cartridge 18. Once empty the detachable cartridge 18 can be disconnected from the body 14 and a new cartridge 18 attached. This means that the handle 80 can be used multiple times by simply replacing the cartridge 18.

In the immediately preceding embodiment, the cartridge 18 engages a moveable sleeve 92 that is connected to the body 14 to thereby hold the cartridge 18 in place during use. The moveable sleeve 92 may include a child lock to inhibit unauthorised tampering. As further illustrated in the figures, especially FIGS. 33a to 33b, the sleeve engages catch 94 as will subsequently be explained.

Turning back to FIGS. 27 and 28, the lower jaw 22 includes a plurality of grooves 96 that cooperate with the piercing elements 32 to assist in the piecing of the leaf. The piercing elements 32 align the grooves 96 so that the raised area between the grooves 96 applies pressure to the leaf surface to assist in the piercing thereof, in a similar fashion to the foam pad as previously discussed. The grooves 96 allow sideways or lateral misalignment of the jaws 20, 22, as may occur when a user closes the jaws. The piercing elements 32 in the present embodiment are surrounded by a circumferential skirt 98 to inhibit inadvertent contact with the piercing elements 32. This circumferential skirt 98 protects the piercing elements 32 and also assists in pushing the leaf off the piercing elements 32 after treatment of the leaf. The body 14 also includes a spacer 100 to maintain a predetermined distance between the jaw 20, 22 when in the closed position, to thereby inhibit the piercing elements 32 from impinging upon the sides of the plurality of grooves 96, which may damage the piercing elements 32 or lead to leakage therefrom.

Figure 29:
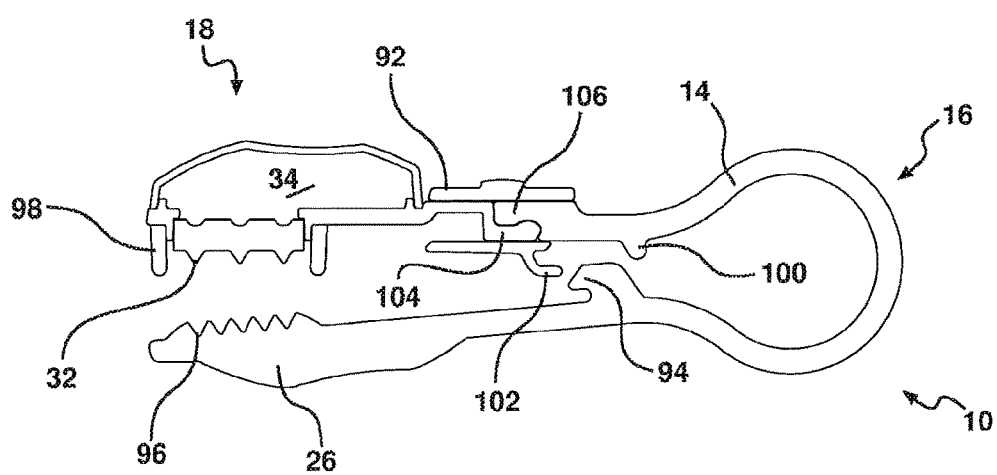
FIG. 29 is a cross-sectional view through F-F of the chemical applicator of FIG. 27.
Figure 30:
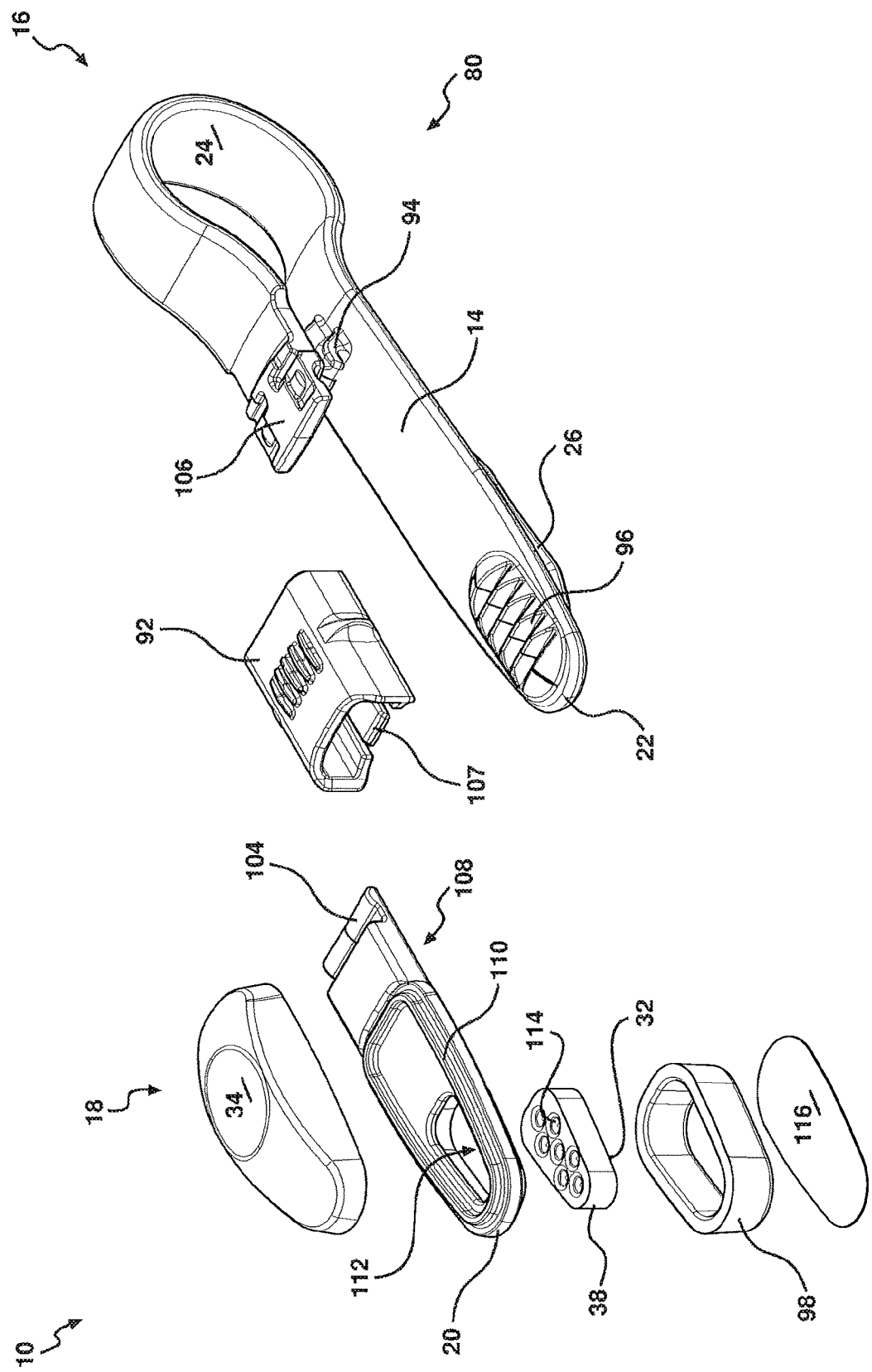
FIG. 30 is a perspective exploded view of the chemical applicator of FIG. 27.

As illustrated in FIG. 29, the moveable sleeve 92 includes an engagement member 102 for engagement with the catch 94, as will be discussed with respect to FIGS. 33a to 33b. FIG. 29 further illustrates the configuration of the connection between the cartridge 18 and the body 14, wherein the cartridge 18 has a tongue 104 that engages with a cooperatingly shaped end 106 of the body 14. The tongue 104 and end 106 are held in engagement by the moveable sleeve 92. By moving the moveable sleeve 92 in a rearward direction the cartridge 18 can be detached from the handle 80. A biased latch 107 is illustrated in FIG. 30 that acts to push the tongue 104 upwardly against end 106 when the moveable sleeve 92 is in a forward position. As the moveable sleeve 92 is moved rearwardly the biased latch 107 is able to be moved downwardly or outwardly to allow the passage of the tongue 104 when attached or detaching the cartridge 18.

Figure 31:
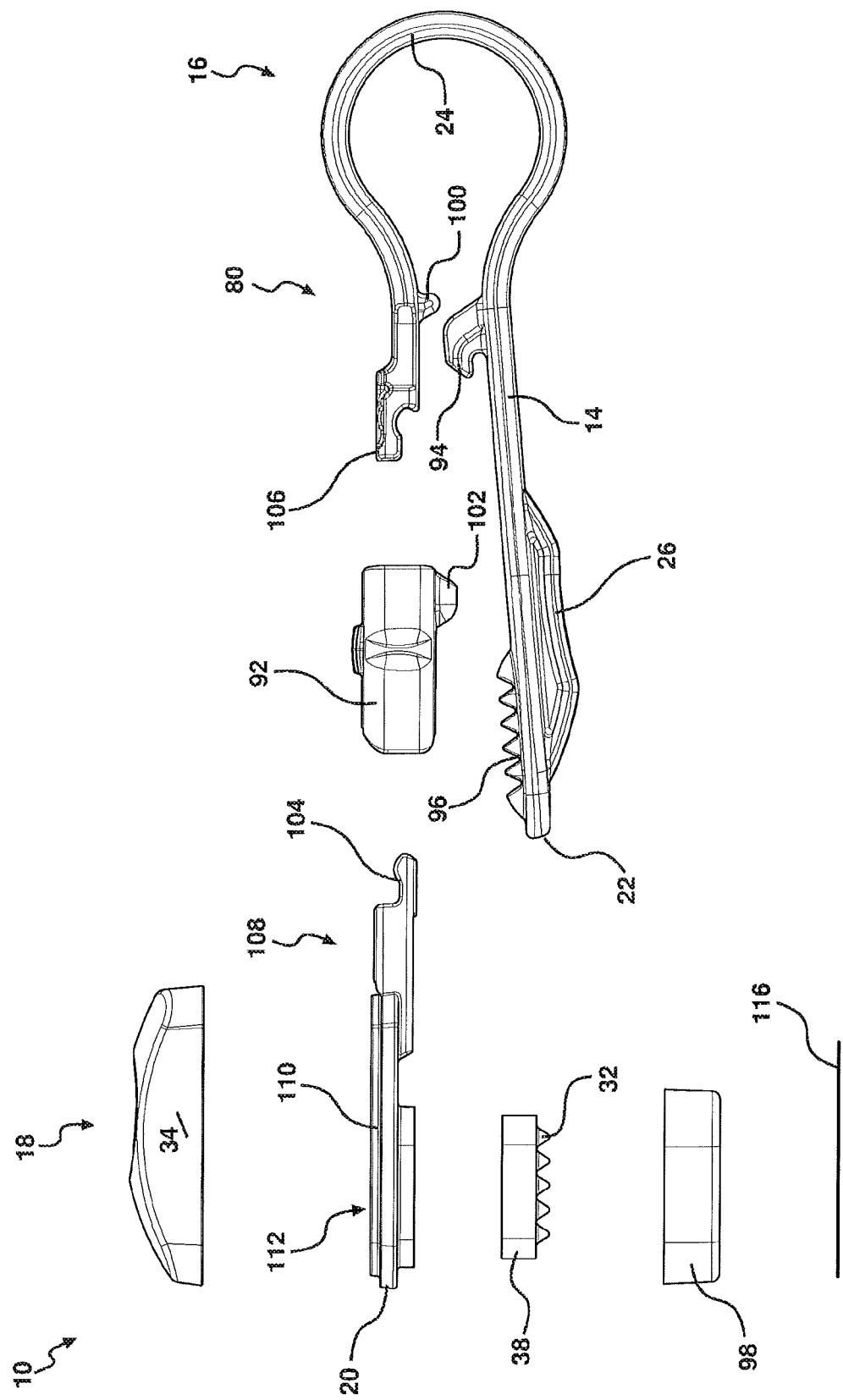
FIG. 31 is a side exploded view of the chemical applicator of FIG. 27.

As illustrated in FIGS. 30 and 31, the cartridge 18 may comprise a tank 34 that is welded or glued to a base frame 108 having a cooperatingly shaped upstand 110, a porous member 32/38 and a circumferential skirt 98. The base frame 108 includes a hole 112 extending therethrough that is shaped to accommodate the porous base 38 therein. The porous base 38 includes recesses in an upper side to facilitate the movement of fluid from the tank 34 to the piecing elements 32. As further illustrated in FIGS. 30 and 31, a removable film 116 may be attached over the outer edge of the circumferential skirt 98 to inhibit leakage or tampering prior to use.

Figure 32A:
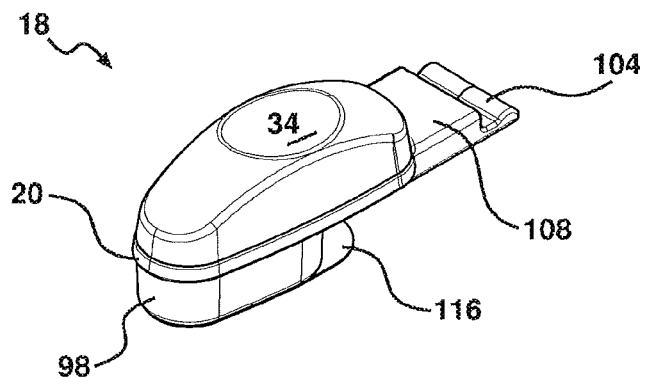
FIG. 32a is a top perspective view of the cartridge of the chemical applicator of FIG. 27.
Figure 32B:
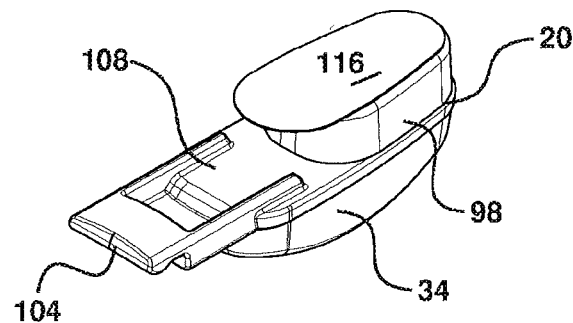
FIG. 32b is an underside perspective view of the cartridge of the chemical applicator of FIG. 27.
Figure 32C:
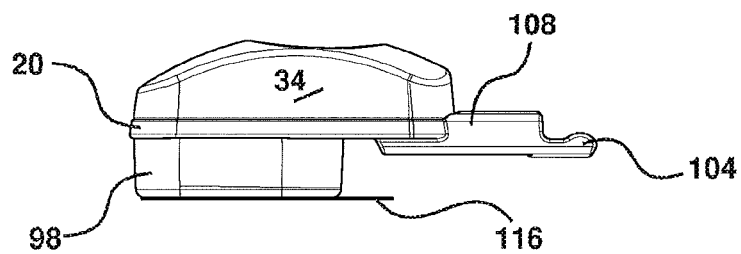
FIG. 32c is a side view of the cartridge of the chemical applicator of FIG. 27.

FIGS. 32a to 32c illustrate the cartridge 18 in isolation from the body 14. The Inventor envisages that a multipack of cartridges 18 would be provided to a user, in a similar fashion to disposable razors, wherein the user would be able to replace the cartridge 18 when all the chemical within the tank 34 has been applied. In some embodiments, the tank 34 would be constructed from clear material or at least have a transparent window through which the user can assess to amount of chemical remaining within the tank 34.

Figure 33A:
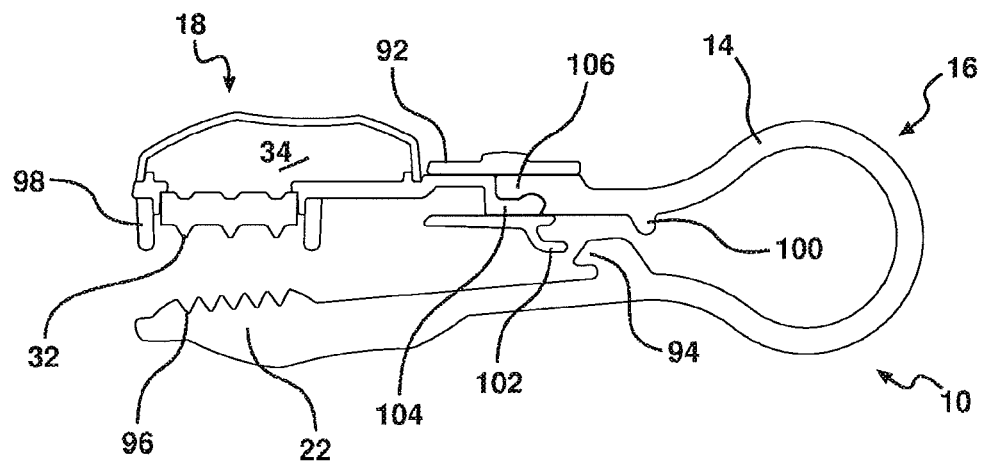
FIG. 33a is a cross-sectional view through F-F of the chemical applicator of FIG. 27 in an open position.
Figure 33B:
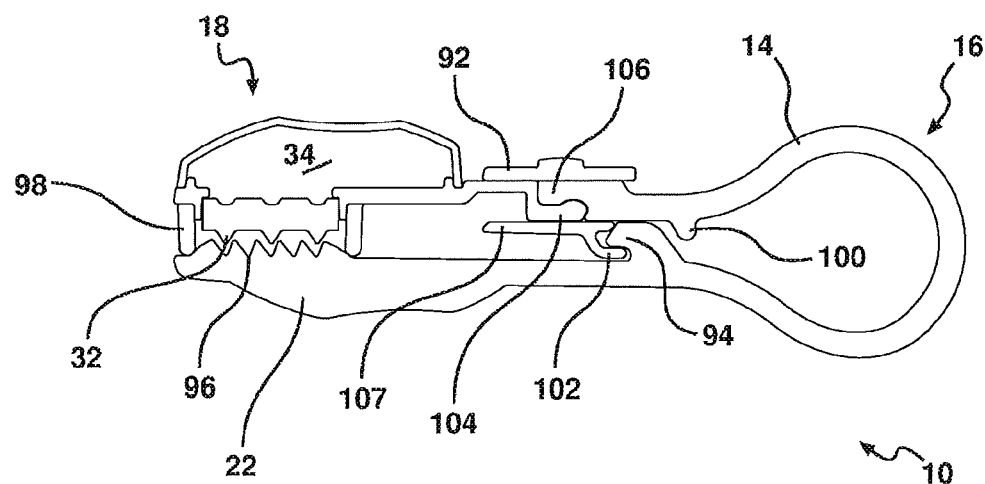
FIG. 33b is a cross-sectional view through F-F of the chemical applicator of FIG. 27 in a closed position.

Turning to FIGS. 33a and 33b there is illustrated a locking means by which the apparatus 10 is held in a closed positioned when not in use. The reader should appreciate that having the apparatus closed when not is use reduces that chance of a child coming into contact with the piercing elements 32 and also means that piercing elements 32 will be inhibited from drying out during storage.

FIG. 33a illustrates the apparatus 10 in an open position wherein it can be used in a fashion as previously discussed. When the user wants to close the apparatus 10 for storage or between uses, they apply pressure so that the jaws 20, 22 are brought together and the circumferential skirt 98 abuts the upper surface of the lower jaw 22. The moveable sleeve 92 is then slid rearwardly whereby the engagement member 102 of the moveable sleeve 92 engages the catch 94 on the body 14. This will thereby retain the apparatus 10 in the closed position until the moveable sleeve 92 is slid forward. Although not illustrated the cooperating engagement member 102 and catch 94 may include a hook or ridge that acts as a child lock to inhibit a child from sliding the moveable sleeve 92 forward, but which under greater force will disengage to permit movement of the moveable sleeve 92.

As the reader should appreciate, when the moveable sleeve 92 is slid rearwardly such that the engagement member 102 engages the catch 94, the join between the tongue 104 and end 106 is not affected. To remove the cartridge 18 the moveable sleeve 92 must be moved rearwardly when the jaws 20, 22 of the apparatus 10 are open.

Figure 34A:
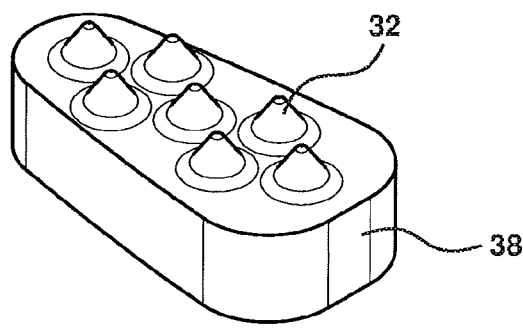
FIG. 34a is a perspective view of the base/piercing elements of FIG. 31.
Figure 34B:
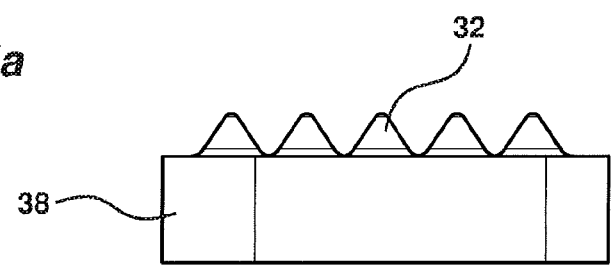
Figure 35A:
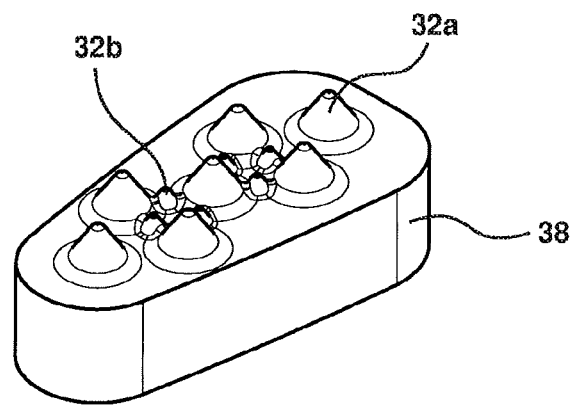
FIG. 35a is a perspective view of an alternate embodiment of the base/piercing elements.
Figure 35B:
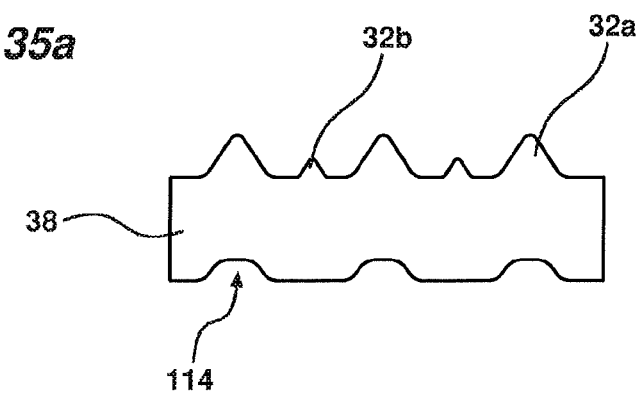
Figure 36:
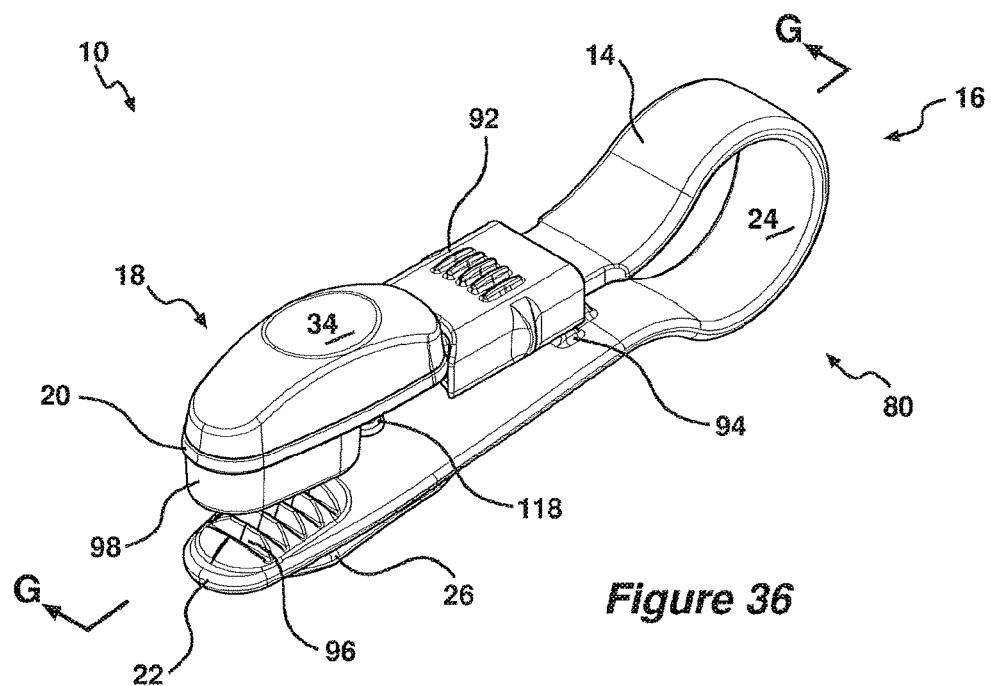
FIG. 36 is a perspective view of a fourth embodiment of the chemical applicator of the present invention.
Figure 37:
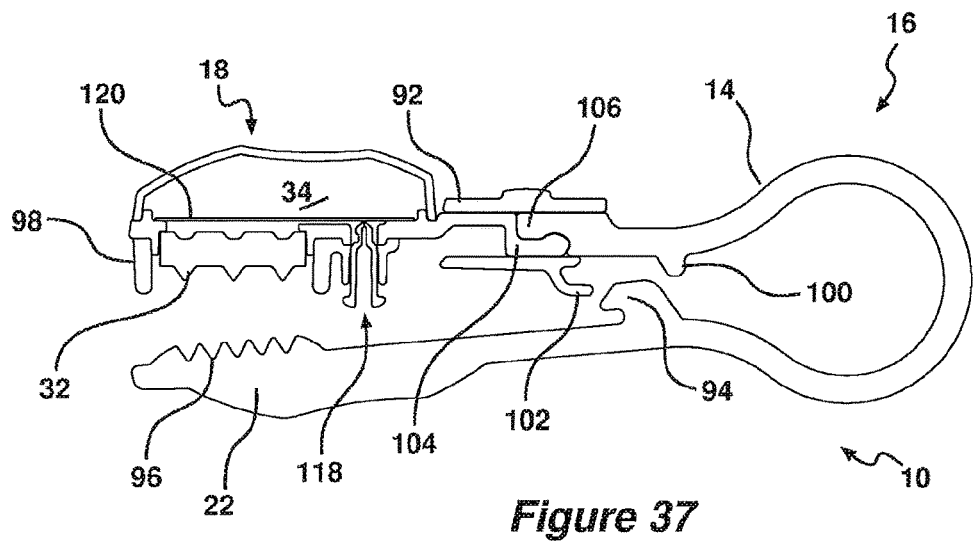
FIG. 37 is a cross-sectional view through G-G of the chemical applicator of FIG. 36.
Figure 38:
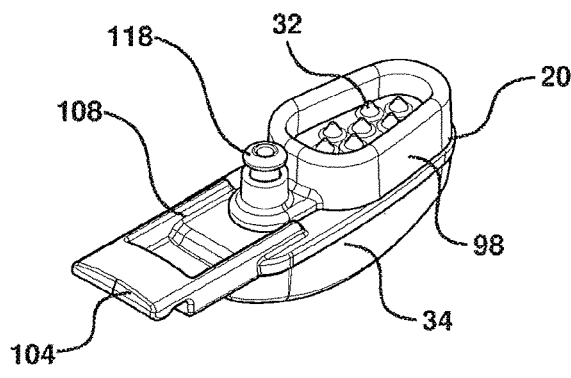
FIG. 38 is an underside perspective view of the cartridge of the chemical applicator of FIG. 36.

FIGS. 34a, 34b illustrate one embodiment of the elongate porous piercing elements 32 and porous base 38 wherein the piercing elements 32 are of uniform or generally uniform length. In another embodiment, as illustrated in FIG. 35a, 35b the piercing elements 32a and 32b are of different lengths. The Inventor envisages that having a plurality of porous piercing elements or spikes of different heights may assist in the piercing of leaves of different thicknesses, widths or lengths.

FIGS. 36 to 42b illustrate still another embodiment of the apparatus 10 which includes a valve pin 118, and a membrane 120, which is positioned within the tank 34 and acts to seal the tank 34 prior to use. The valve pin 118 may also provide venting of the tank 34 as the fluid level drops.

Figure 39:
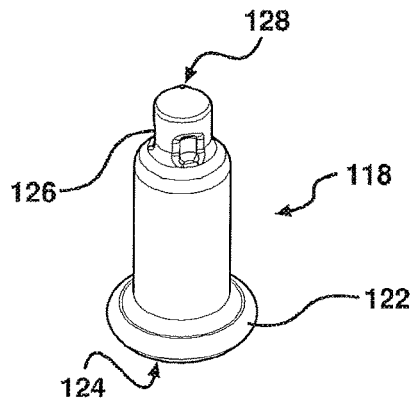
FIG. 39 is a perspective view of the pin of FIG. 38.
Figure 46:
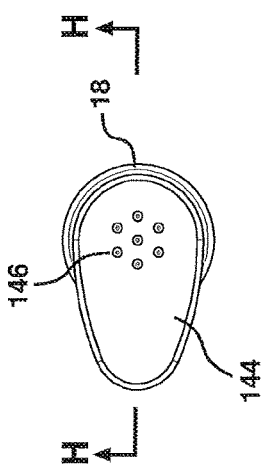
FIG. 46 is an underside view of the chemical applicator of FIG. 43 illustrating the holes extending through the biased support.
Figure 47:
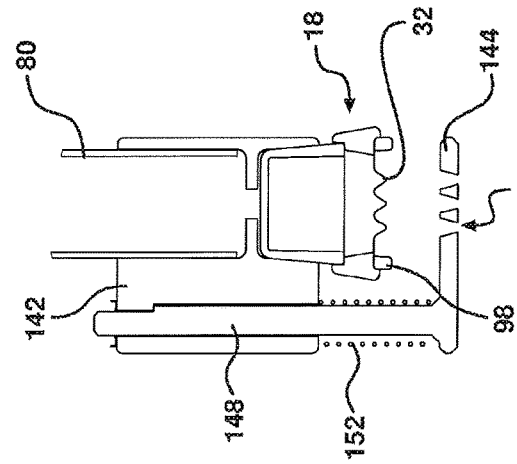
FIG. 47 is a cross-sectional view of the chemical applicator of FIG. 46 through H-H.
Figure 45:
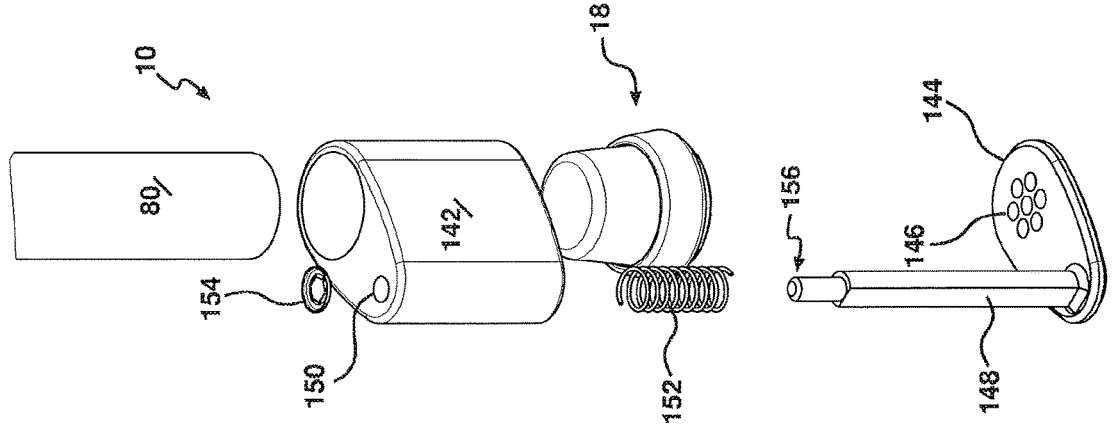
FIG. 45 is an exploded view of the chemical applicator of FIG. 43.
Figure 44:
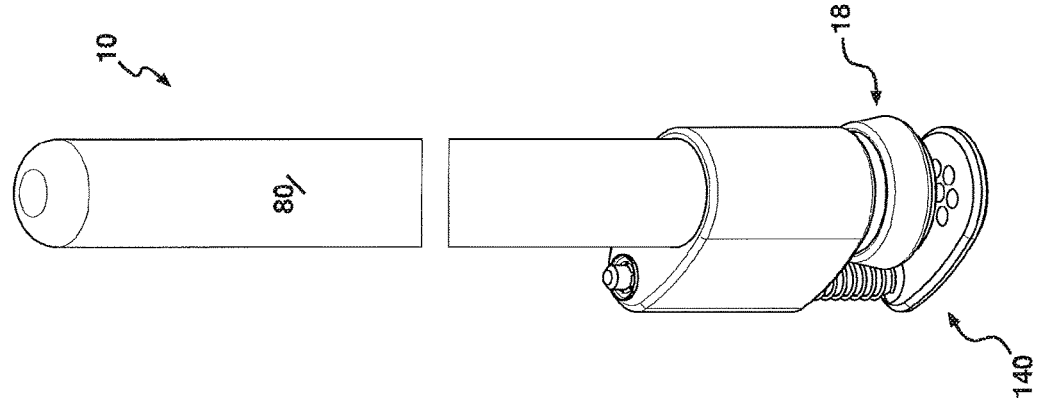
FIG. 44 is an enlarged view of the top the ends of the chemical applicator of FIG. 43.
Figure 43:
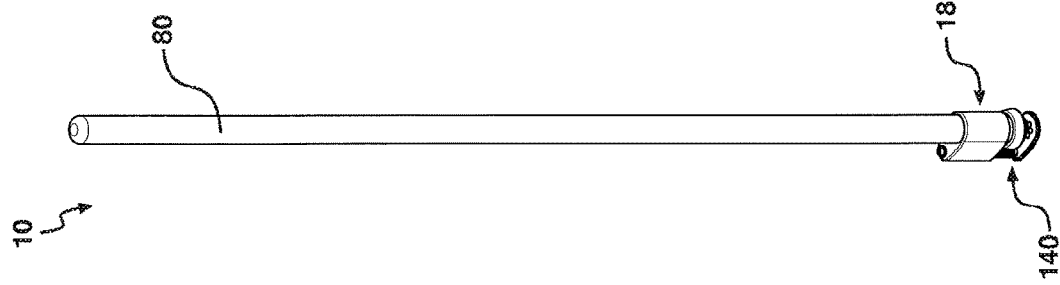
FIG. 43 is a perspective view of a fifth embodiment of the chemical applicator of the present invention being used to treat a plant having a prostrate growth habit.
Figure 49:
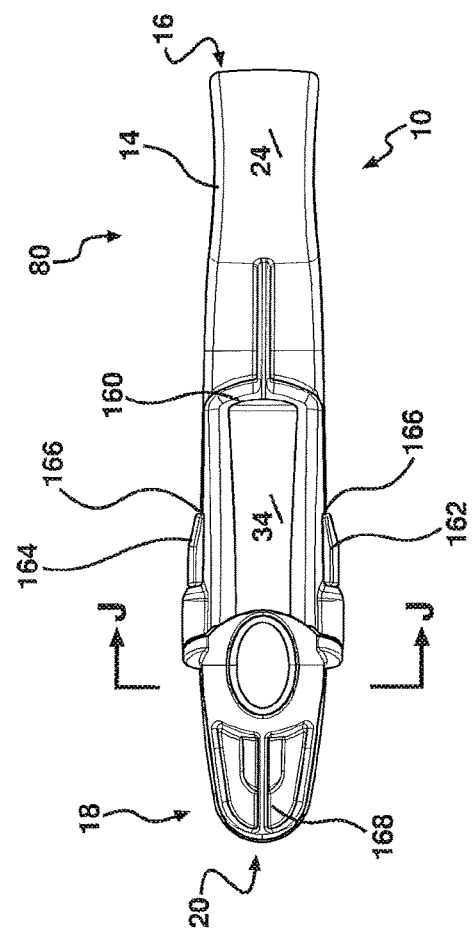
FIG. 49 is a top view of the chemical applicator of FIG. 48.

As illustrated in FIG. 39 the valve pin 118 includes a head 122, aperture 124, grooves 126 and vent hole 128. Venting occurs with the exterior of the tank 34 through aperture 124 and vent hole 128.

The valve pin 118 is movably held within engagement member 130 and is biased outwardly so that when the jaws 20, 22 are open the valve pin 118 seals against the membrane 120. The engagement member 130 may comprise or include an elastomeric sheath that is overmoulded with a circumferential skirt whereby the skirt is compressed by the pin when the jaws are closed and provides the biasing to move the valve pin 118 outwardly when the jaws are open.

FIGS. 40a and 40b illustrated the apparatus 10 prior to first use wherein the membrane 120 is intact. Upon squeezing of the hinged portion 16 to treat a leaf, as illustrated in FIGS. 41a, 41b, the valve pin 118 pierces the membrane 120 and allows the chemical to flow through groove/s 126 into the porous elements 38, 32, as indicated by the arrow.

When in the locked position, as illustrated in FIGS. 42a, 42b, the valve pin 118 retract under bias into a position where the hole in the membrane 120 is blocked and the chemical is inhibited from flowing through the hole in the membrane 120 created by the valve pin 118. The Inventor envisages that this will inhibit leakage during storage.

FIGS. 43 to 47 illustrate an alternate upright apparatus 10 that includes a biased support 140. When treating weed having a prostrate growth habit it is important that the amount of chemical that comes into contact with the underlying plants, such as blades of grass, is minimised. In the present embodiment, the biased support 140 includes a main body 142 that is located intermediate of the handle 80 and applicator portion 18, a base 144 having apertures 146 that correspond vertically to the location of the porous piercing elements 32, a shaft 148 that engages aperture 150 in the main body 142, a biasing spring 152 surrounds the shaft 148, and a split ring 154 that engages the top 156 of the shaft 148.

In use the base 144 is slid under the leaf of a plant to be treated. Downward pressure is then applied by the user to the handle 80, which causes the shaft 148 to retract into or through the main body 142, thereby causing the porous piercing elements 32 to push through the leaf and apertures 146. As the reader will appreciate the base 144 provide support for the underside of a leaf being treated while minimising the amount to chemical coming into contact with the underlying plants, such as the lawn.

FIGS. 48 to 60 illustrates another embodiment of the apparatus 10 wherein the applicator portion is in the form of a detachable canister 18. The tank 34 of the present embodiment slidably engages a recess 160 in the body 14. The detachable canister 18 is held within the recess 160 by deflectable clips 162, 164 that are biased outwardly and sidewardly engage respective slots 166 in opposite sides of the body 14. In this way, the canister 18 can be attached to and removed from the handle 14, such as when it needs replacing, as illustrated in FIGS. 52 to 55.

Figure 50:
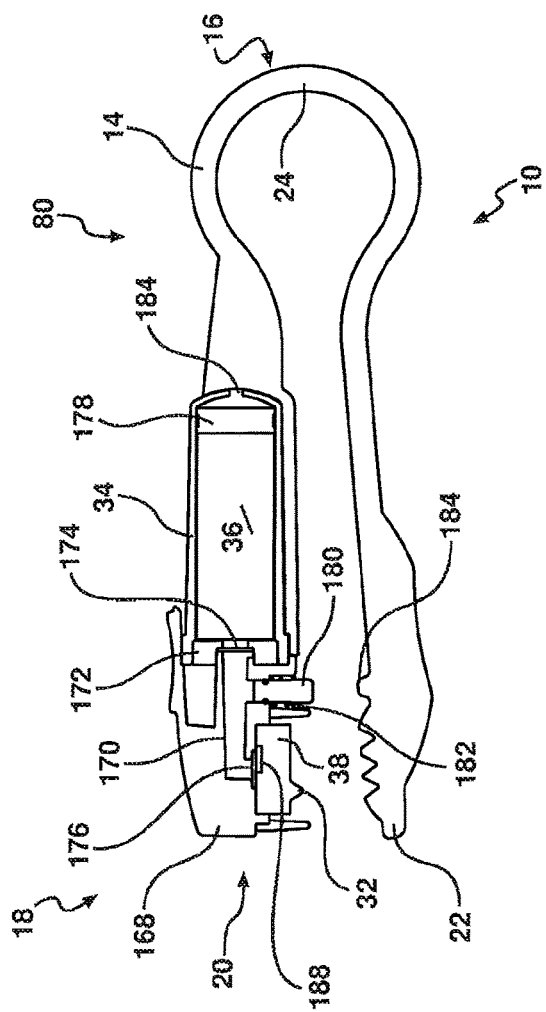
FIG. 50 is a cross-sectional view of the chemical applicator of FIG. 48 through I-I.
Figure 48:
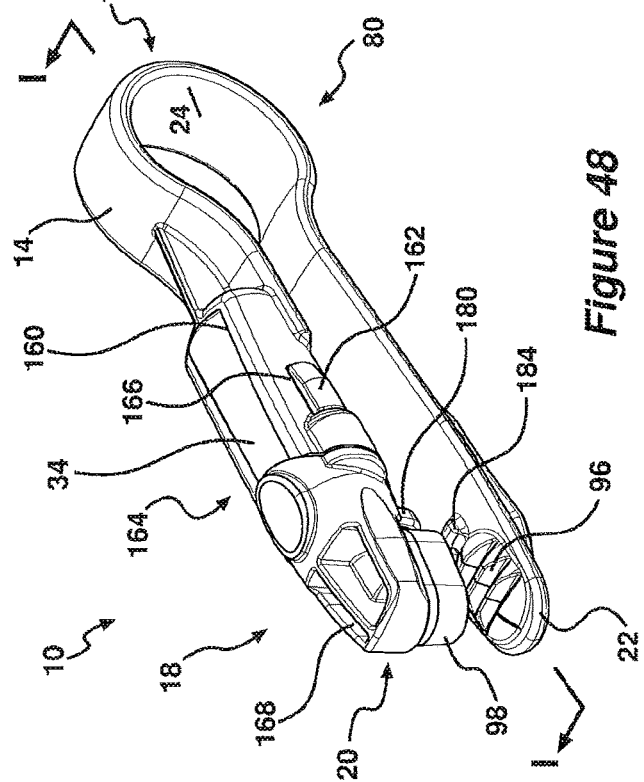
FIG. 48 is a perspective view of a sixth embodiment of the chemical applicator.
Figure 51:
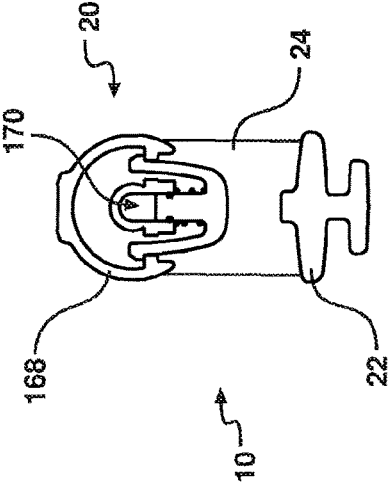
FIG. 51 is a cross-sectional view of the chemical applicator of FIG. 49 through J-J.

As illustrated in FIGS. 50, 55 and 57, the canister 18 comprises the tank 34 that forms the reservoir chamber 36, and a manifold 168 that is in fluid communication with the porous base 38 and piercing elements 32, by way of passageway 170. The canister 18 is attached to the manifold 168 by joiner 172. The reader should appreciate that the joiner 172 may be in the form of a separate intermediate member or the canister 18 may be attached directly to the manifold 168 by way of welding, gluing, a clip or cooperating threads. The reader should also appreciate that the manifold 168 forms the upper jaw 20 of the apparatus 10.

Two flap valves 174, 176, are positioned along or adjacent the passageway 170 to control the flow of fluid therealong. The flap valves 174, 176, may be constructed from rubber, elastomer, fluoroelastomer or any other form of suitable material. The term 'valve' should be understood to include glands or weep holes that are able to be closed.

As further illustrated in FIG. 50, plunger 178 is positioned within the tank 34 and is acted upon by actuator/pump 180, which is located along passageway 170, to thereby replenish the chemical within passageway 170 to ensure adequate chemical for the porous base 38 and piercing elements 32. The actuator/pump 180 is biased outwardly by way of spring 182. The second or lower jaw 22 includes a protrusion 184 that is configured to push the actuator/pump 180 inwardly against the bias of the spring 182, when the jaws 20, 22 are pushed together, as illustrated in FIG. 57.

The tank 34 includes an opening 184 to permit movement of air into the reservoir chamber 36 rearwardly of the plunger 178, to inhibit the formation of a vacuum behind the plunger 178, which would adversely affect to operation of the apparatus 10.

As illustrated in FIGS. 50 and 58-60, the porous base 38 includes a depression 186 to allow operation of the flap valve 176. The reader should however appreciate that the valve 176 could be positioned at a distance from the porous base 38 and therefore the depression 186 would not be required.

FIGS. 61 to 66 illustrate still another embodiment, that includes porous piercing spikes each including a generally solid base 200 and a porous tip 202. The porous tip 202 may be press fitted or heat welded onto the solid base 200. The solid bases 200 may be formed on an underside of the manifold 168 or attached thereto. An elastomeric pad 204 is glue or otherwise attached to the manifold and includes one-way glands or valves 206 that are formed around each solid base 200. In this way when the gland or valve 206 opens the porous tip 202 will be in fluid communication with the reservoir 36 and can receive chemical thereinto. In this way, the chemical is able to flow over and into the porous tip to thereby inhibit dripping and provide a store of chemical during use to thereby improve the efficacy of the device.

The present invention also includes a leaf ejector plate 208, which is configured to push the leaf off the spikes 32. Furthermore, the leaf ejector plate 208 incorporates a piston 210 and return spring 212 for pumping the chemical into the passageway 170, as previously discussed.

During the piercing action the chemical is displaced from the manifold 168 by the piston 210 and flows out through the glands 206 and onto the spike 32, which is coated with some of the chemical being absorbed into the porous tip 202. The porosity of the tips 202 helps to distribute the chemical evenly and also provides surface pockets that can hold chemical and readily transfer it to the perforations in the leaf.

In another embodiment, the piercing element or elements may be constructed sustainably from the chemical that is to be applied to the plant, wherein the piercing element or elements, or a part thereof, are dissolvable or otherwise liquefiable, by an activating liquid or substance, whereby the chemical is thereby in a form that can be applied to the plant tissue for absorption thereof.

The device therefore may take the form of any of the above embodiments or other embodiments, for applying a chemical to a plant tissue, however the chemical reservoir may be filled with the activating liquid or substance that can be applied to the piercing element or elements just prior to piecing of the plant tissue to initiate, for a desired period of time, a chemical reaction or other change of state causes the generally solid piercing element or elements to dissolve or liquefy. The reader should appreciate that the chemical reaction or liquefaction is preferably only for a short period of time and then is discontinued to pervert the continued liquefaction of the piercing element or elements. For instance, in the presence of water the piercing element or elements may dissolve and then when the piercing element or elements are dry they stop dissolving and remain in their generally solid form until water is again applied to the piercing element or elements.

In one embodiment, the piercing element or elements may be in a crystallised form that is dissolvable or otherwise liquefiable by a liquid or plant enzyme or as a result of chemical reaction or change of state in the presence of an activating liquid or substance.

Therefore, the piercing element or elements are in an inactive state prior to use and then when a user wishes to apply the chemical to a plant tissue the activating liquid or substance is applied to the piercing element or elements to cause partial or surface liquefaction to enable application of the chemical to the plant tissue.

In another embodiment, liquefaction of the piercing element or elements is caused by a plant enzyme or other plant originating substance acting on the piercing element or elements to start the liquefaction or dissolving process, whereby the chemical is in a form that can be taken up or absorbed by the plant.

Therefore, as the reader will appreciate, once the piercing element or elements is/are dissolved or liquefied, the chemical can be introduced into and absorbed by the plant tissue to thereby treat the target plant.

The activating liquid or substance may therefore be applied to the piercing element or elements from the chemical reservoir or may be of a plant originating substance or the activating liquid may be applied directly to the plant tissue, such as the leaf, prior to use of the piercing element or elements.

In the embodiment where the activating liquid is contained within the chemical reservoir, the activating liquid in one form is water that is applied to the piercing element or elements, to causes an outer layer to be liquefied so that it can be applied to the plant tissue as the piercing member or members pierce the plant tissue.

The piercing element or elements may be substantially formed from a crystallised glyphosate (N-(phosphonomethyl)glycine).

The dissolvable piercing element or elements may include a carrier or bonding agent that solidifies or holds the chemical and allows for it to be liquefied under a desired condition.

The carrier may be in the form of an inert matrix wherein the chemical to be applied to the plant is held within the matrix and dissolved from therewithin. In another embodiment, the matrix may be activated by the activation liquid or substance wherein the matrix is configured to hold the chemical until it is activated, whereupon the matrix releases the chemical at a desired rate.

The reader should appreciate that the phrase porous piercing member or element used throughout the specification may also refer to a piercing element that may be penetrated by an activating liquid or substance to thereby liquefy or partly liquefy the chemical to allow for it to be applied to the plant tissue.

The piercing element or elements may be at least partly porous or may be generally solid but which allows an activating liquid or chemical to penetrate thereinto or dissolve a surface layer.

The skilled addressee will now appreciate the advantages of the illustrated invention over the prior art. In one form the invention provides an apparatus that delivers a chemical to a plant tissue while minimising the risk to the surrounding environment. The porous piercing elements of the present invention contain at least a portion of the chemical and therefore little is applied to the outer surface of the target plant during delivery. In this way, the potential for wash-off of the chemical is reduced since the chemical is applied to interior of the target plant, where it is likely to be of the greatest efficacy.

The apparatus facilitates the impregnation or introduction of the chemical into the tissue of the target organism. This is in contrast to many of the currently available devices that apply the chemical to the exterior surface of the tissue. The chemical is impregnated or introduced into the target organisms to thereby improve the efficacy of the applied chemical, at lower doses than achieved with conventional devices and methods of application, which also minimises exposure of non-target animals or plants to the chemical. The illustrated invention therefore provides commercial choice or at least gives the public a useful alternative. Various features of the invention have been particularly shown and described in connection with the exemplified embodiments of the invention, however it must be understood that these particular arrangements merely illustrate the invention and it is not limited thereto. Accordingly, the invention can include various modifications, which fall within the spirit and scope of the invention.

The invention claimed is:

1. An apparatus to introduce a chemical into a plant tissue of a target plant, including:
    a body being graspable by a user; and
    an applicator portion attachable to or forming a part of said body, the applicator portion including a reservoir chamber adapted for holding said chemical, and one or more porous piercing elements that are elongate and in fluid communication or capable of fluid communication with said reservoir chamber, the one or more porous piercing elements each having a length of greater than 1 mm and less than 10 mm, and being configured to pierce said plant tissue, each of the one or more porous piercing elements comprising a respective shaft and a generally tapered tip, wherein the shaft has a diameter of 0.5 mm up to about 2 mm, whereby a ratio of diameter of shaft to length of porous piercing element is less than 1:10; wherein each of said one or more porous piercing elements includes multiple pores and pathways for passage of said chemical therethrough; and
    wherein the reservoir chamber and the one or more porous piercing elements are configured to draw or move said chemical within the reservoir chamber and into said one or more porous piercing elements, such that as the one or more porous piercing elements penetrate into or through said plant tissue, the chemical is applied to an edge of a resultant incision in the plant tissue.

2. The apparatus in accordance with claim 1, wherein the applicator portion comprises a first jaw that is configured to cooperate with a second jaw on the body, such that said first and/or second jaws are moveable and the plant tissue of the target plant being positionable therebetween, whereby upon closure or partial closure of the first and second jaws, the one or more porous piercing elements piece the plant tissue of the target plant or plants.

3. The apparatus in accordance with claim 2, wherein the one or more porous piercing elements are constructed from an absorbent wicking material that draws the chemical by capillary action through the one or more porous piercing elements to an outer surface thereof, such that the chemical is applied to the tissue of the target plant or plants when the one or more porous piercing elements pierce the tissue.

4. The apparatus in accordance with claim 3, wherein the one or more porous piercing elements are constructed from a generally rigid sintered material which acts to wick or move the chemical from the reservoir chamber and to thereby present the chemical on an outer surface of the one or more porous piecing elements, such that when the one or more porous piercing elements pierce the plant tissue, some of said chemical is wiped off on the edges of the incision in the plant tissue.

5. The apparatus in accordance with claim 4, wherein the sintered material is one of sintered ceramic, metal, aluminium oxide and silicon carbide.

6. The apparatus in accordance with claim 3, wherein the one or more porous piercing elements are constructed from porous thermoplastic material, cellulosic fibres, compressed fibres, wood pulp, cotton pulp, synthetic fibres, polyesters, polyolefins, superabsorbent polymers, polyacrylic acid, or felt, or a combination thereof.

7. The apparatus in accordance with claim 3, wherein the porosity of the one or more porous piercing elements is configured to deliver the chemical to said outer surface uniformly via capillary action or by providing the multiple pores and pathways, such that the flow rate through the one or more porous piercing elements is configured for a particular chemical held within the reservoir chamber.

8. The apparatus in accordance with claim 3, wherein the one or more porous piercing elements comprise a soft wicking material that is reinforced by a relatively rigid support member.

9. The apparatus in accordance with claim 1, wherein the applicator portion further comprises a base plate, and wherein the one or more porous piercing elements are connected to or formed on the base plate, and wherein the base plate and the one or more piercing elements are made of a same or similar material.

10. The apparatus in accordance with claim 1, wherein the reservoir chamber includes a plunger that is acted upon by an actuator to move said chemical towards said one or more porous piercing elements when the chemical is dispensed therefrom.

11. The apparatus in accordance with claim 1, wherein the shaft is generally cylindrical, or has a polygon shaped cross sectional profile, or is tapered.

12. The apparatus in accordance with claim 1, wherein the reservoir chamber is in fluid communication with the one or more porous piercing elements by way of a passageway, and a valve or valves are located along or adjacent said passageway to control a flow of fluid therethrough, or the one or more porous piercing elements are surrounded by a resiliently deformable circumferential skirt.

13. The apparatus in accordance with claim 1 wherein the one or more porous piercing elements are constructed sustainably from said chemical wherein the one or more porous piercing elements, or a part thereof, are dissolvable or otherwise liquefiable, by an activating liquid or substance, whereby said chemical is thereby in a form that is applied to the plant tissue for absorption thereof to thereby treat the target plant or plants.

14. The apparatus in accordance with claim 1, wherein the one or more porous piercing elements are constructed from one or more of an absorbent wicking material, a sintered material, a porous thermoplastic material, cellulosic fibres, compressed fibres, synthetic fibres, superabsorbent polymers, and felt, and form multiple pores and pathways in each respective porous piercing element.

15. The apparatus according to claim 1, wherein the shaft has a diameter of 0.9 mm up to about 2 mm.

16. A method of applying a chemical to plant tissue of a plurality of target plants, including the steps of:
    a) providing a device having a body and an applicator portion, wherein the applicator portion comprises a first jaw hinged with a second jaw on the body, wherein the applicator portion is detachable from or forms a part of the body; and wherein the applicator portion includes a reservoir chamber and one or more porous piercing elements having respective lengths greater than 1 mm and less than 10 mm, wherein said one or more porous piercing elements being in fluid communication with the reservoir chamber, each of the one or more porous piercing elements comprising a respective shaft and a generally tapered tip, wherein each shaft has a diameter of 0.5 mm up to about 2 mm and a ratio of diameter of shaft to length of porous piercing element is greater than 1:10; wherein each of said one or more porous piercing elements includes multiple pores and pathways for passage of said chemical therethrough;

b) filing said reservoir chamber with the chemical, wherein the chemical is drawn or moves into the one or more porous piercing elements;
c) passing the one or more porous piercing elements into or through said plant tissue of a first target plant and applying the chemical to an interior of the plant tissue or to a side of an incision therein through the multiple pores and pathways;
d) withdrawing the one or more porous piercing elements from the plant tissue; and
e) repeating steps c) and d) to treat said first target plant or a subsequent target plant or plants.

17. The method in accordance with claim 16, including the further steps of:
pressurizing the reservoir chamber; and
impelling said chemical out of the reservoir chamber under pressure and into said one or more porous piercing elements.

18. The method according to claim 16, wherein providing the device as in step a) further includes constructing the one or more porous elements from one or more of an absorbent wicking material, a sintered material, a porous thermoplastic material, cellulosic fibres, compressed fibres, synthetic fibres, superabsorbent polymers, and felt, thereby forming multiple pores and pathways in each respective porous piercing element.

* * * * *